(12) United States Patent
Zeng et al.

(10) Patent No.: US 7,554,748 B2
(45) Date of Patent: Jun. 30, 2009

(54) ZOOM LENS SYSTEM

(75) Inventors: Ji-Yong Zeng, Beijing (CN); Guo-Fan Jin, Beijing (CN); Ying-Bai Yan, Beijing (CN); Min-Qiang Wang, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 323 days.

(21) Appl. No.: 11/439,923

(22) Filed: May 24, 2006

(65) Prior Publication Data

US 2007/0053070 A1    Mar. 8, 2007

(30) Foreign Application Priority Data

Sep. 7, 2005    (CN)    ......................... 2005 1 0037127

(51) Int. Cl.
*G02B 15/14* (2006.01)
(52) U.S. Cl. ........................ 359/691; 359/682
(58) Field of Classification Search ................ 359/691, 359/680–682
See application file for complete search history.

(56) References Cited

U.S. PATENT DOCUMENTS

| | | | | |
|---|---|---|---|---|
| 5,283,693 A * | 2/1994 | Kohno et al. | ................ | 359/691 |
| 5,808,811 A * | 9/1998 | Iyama | ........................ | 359/692 |
| 5,969,881 A * | 10/1999 | Konno | ........................ | 359/691 |
| 6,025,961 A * | 2/2000 | Kohno et al. | ................ | 359/691 |
| 7,085,068 B2 * | 8/2006 | Noda | ........................ | 359/684 |
| 7,414,665 B2 * | 8/2008 | Watanabe et al. | ........... | 348/363 |
| 2005/0024739 A1 | 2/2005 | Noda | | |
| 2005/0057817 A1* | 3/2005 | Ori | ............................ | 359/676 |
| 2008/0106807 A1* | 5/2008 | Minakata et al. | ............ | 359/781 |

* cited by examiner

*Primary Examiner*—Jordan M. Schwartz
(74) *Attorney, Agent, or Firm*—D. Austin Bonderer

(57) ABSTRACT

An exemplary zoom lens system includes a negative first lens group and a positive second lens group. The first lens group includes a meniscus-shaped first lens with negative refracting power and a second lens with positive refracting power. The first lens has a concave surface facing an image side. The second lens group includes an aperture stop, a biconvex third lens with positive refracting power, and a meniscus-shaped fourth lens with negative refracting power. The fourth lens has a concave surface facing an object side. The first lens, the second lens, the aperture stop, the third lens and the fourth lens are aligned in that order from the object side to the image side.

16 Claims, 29 Drawing Sheets

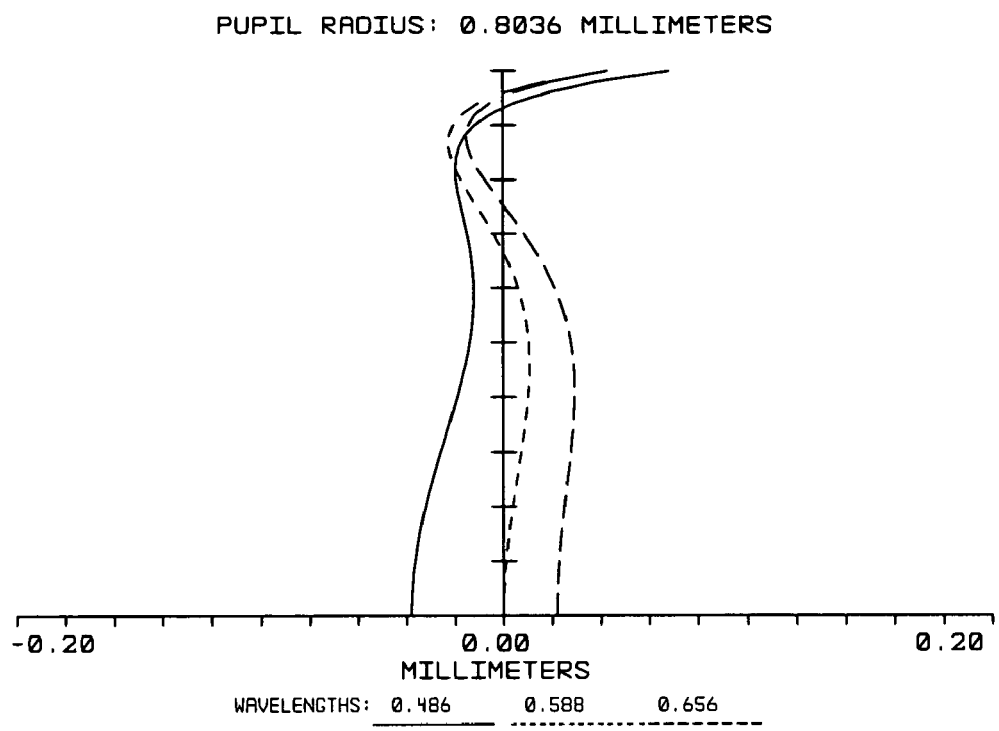
FIG. 12
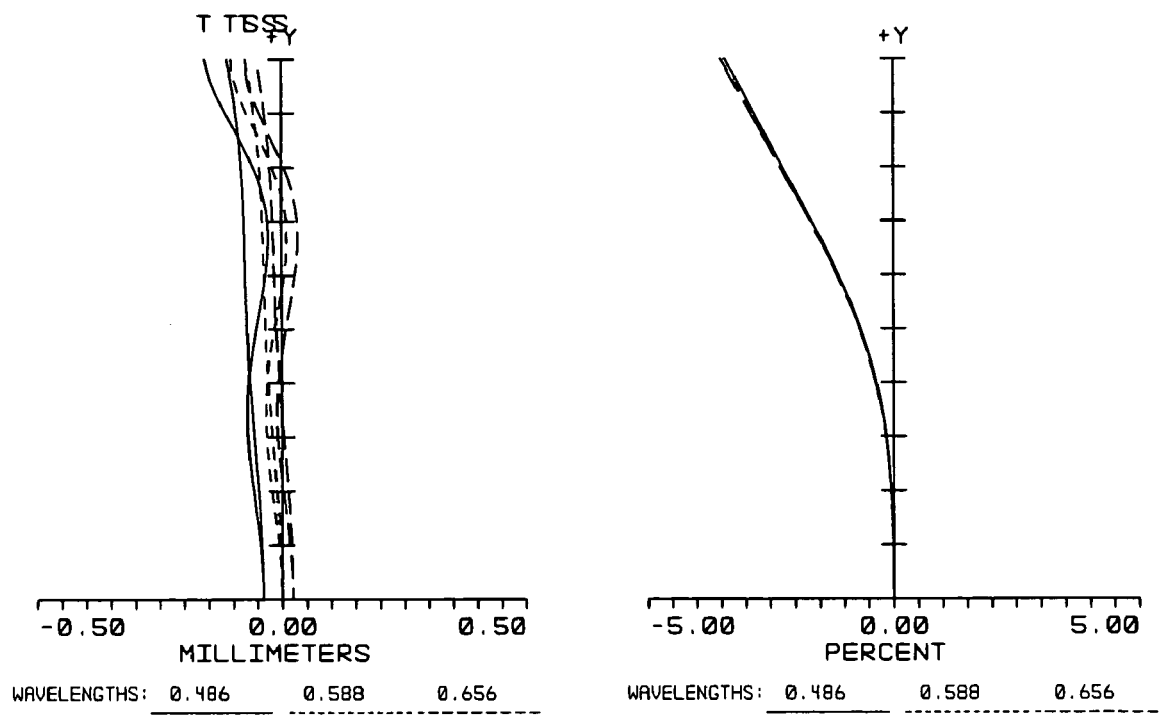
FIG. 13
FIG. 14

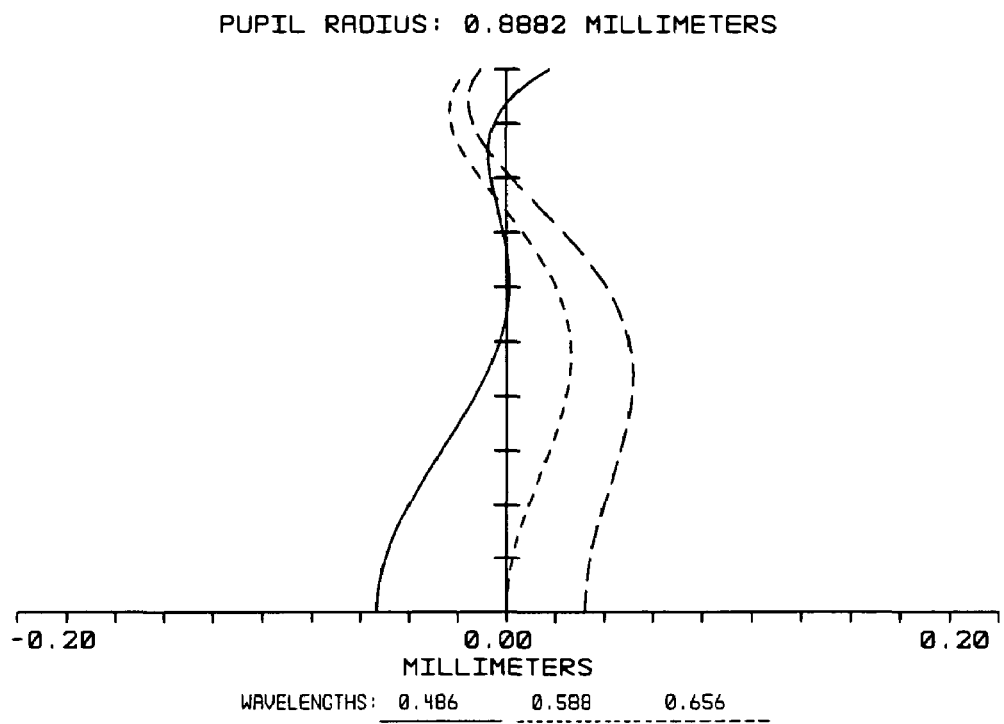
FIG. 24
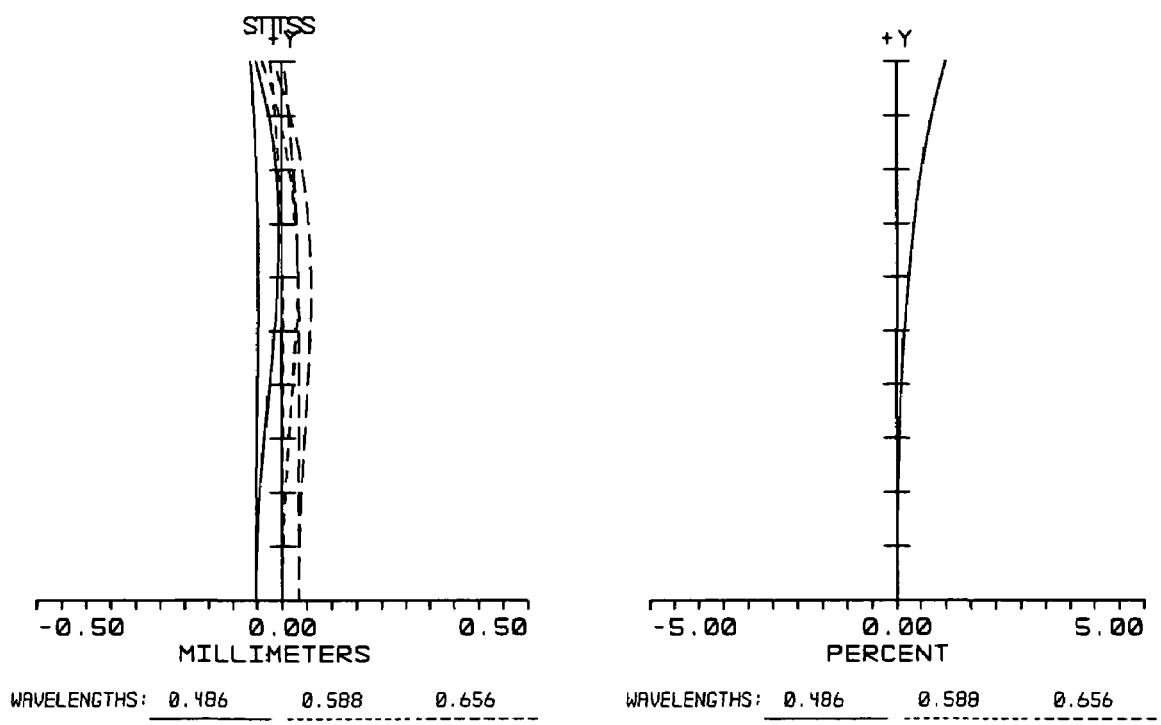
FIG. 25
FIG. 26

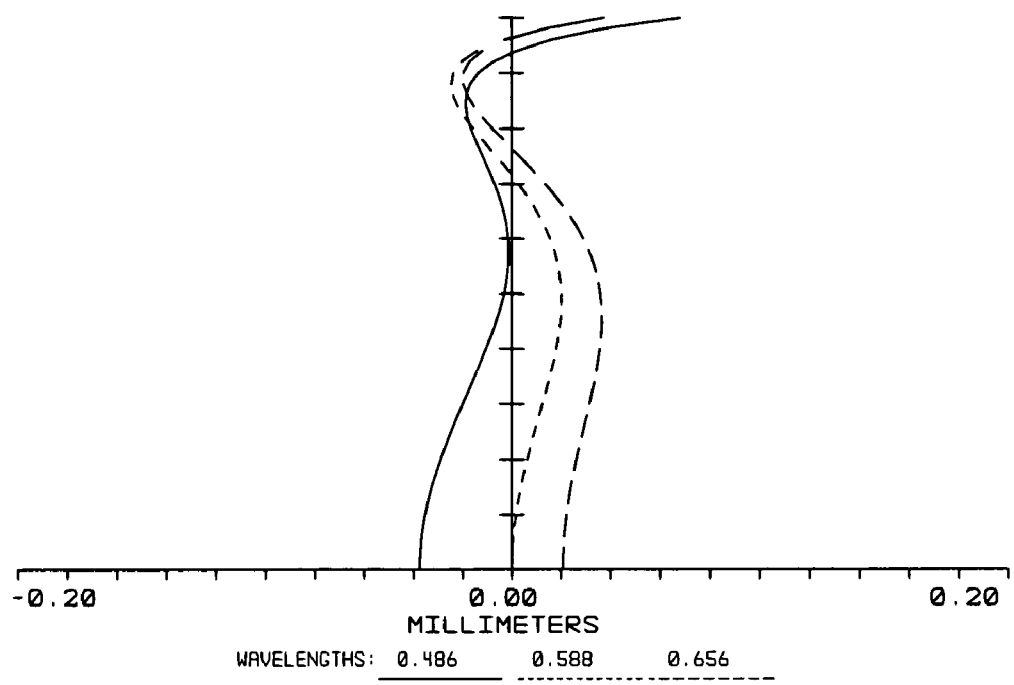
FIG. 39
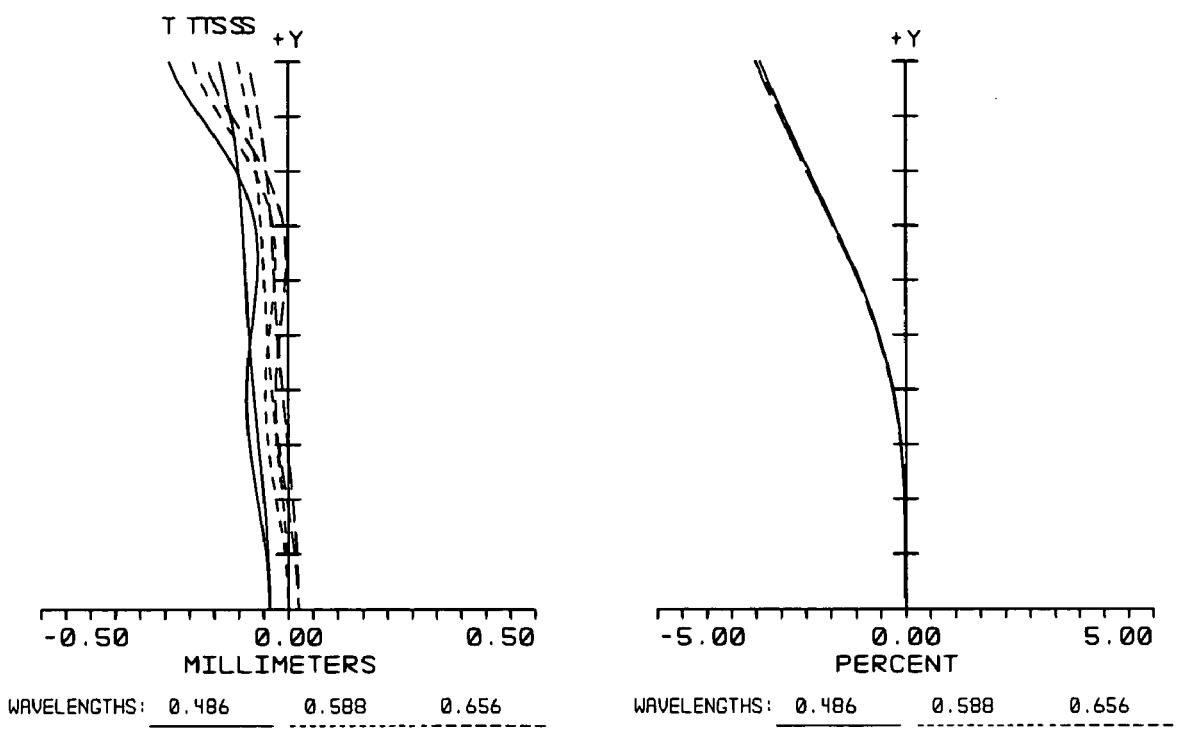
FIG. 40
FIG. 41

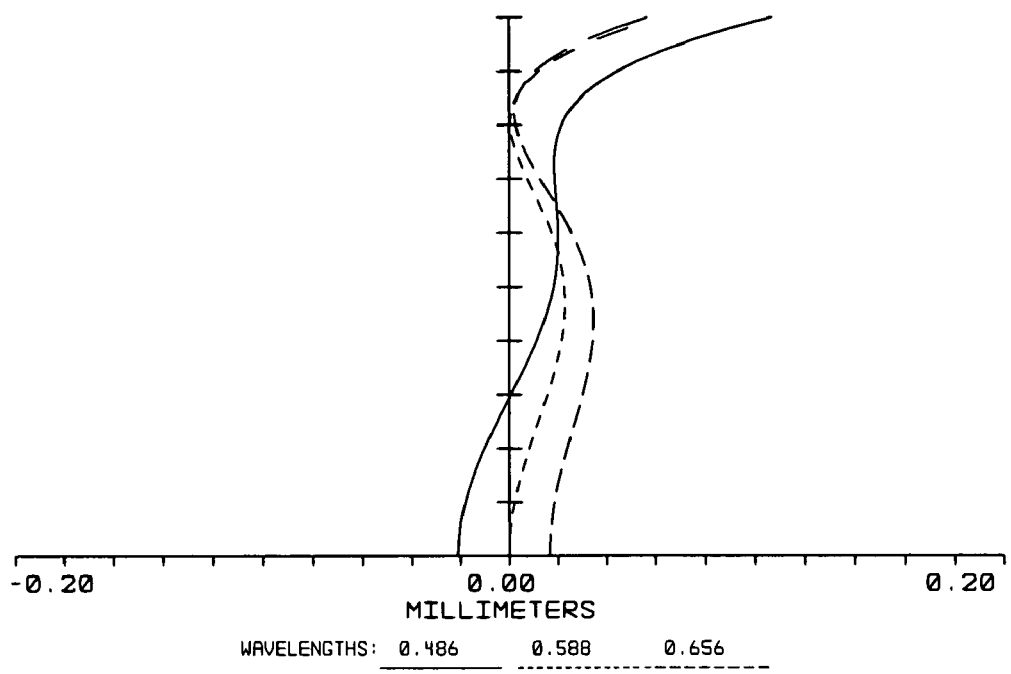
FIG. 54
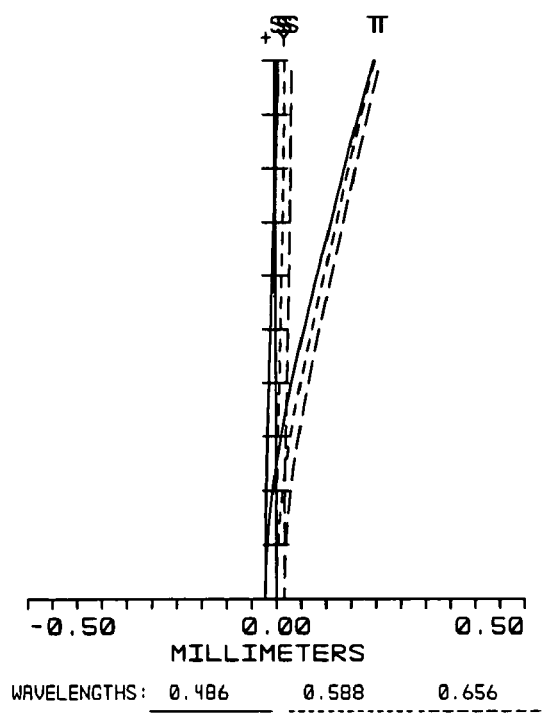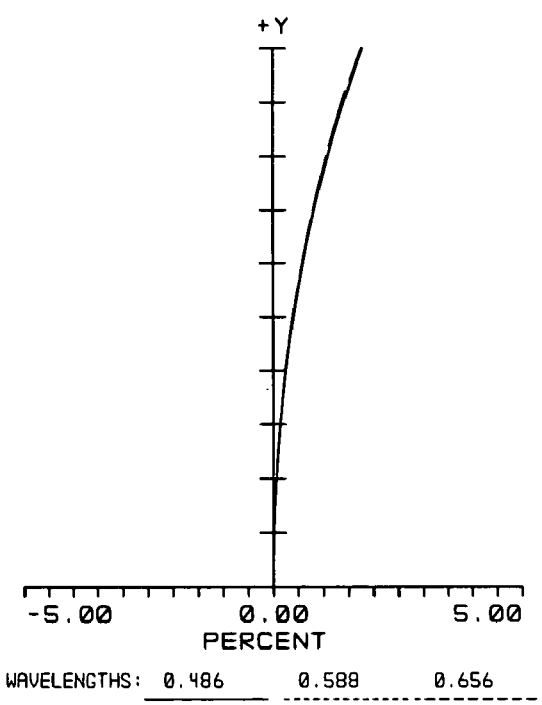
FIG. 55    FIG. 56

PUPIL RADIUS: 0.8232 MILLIMETERS

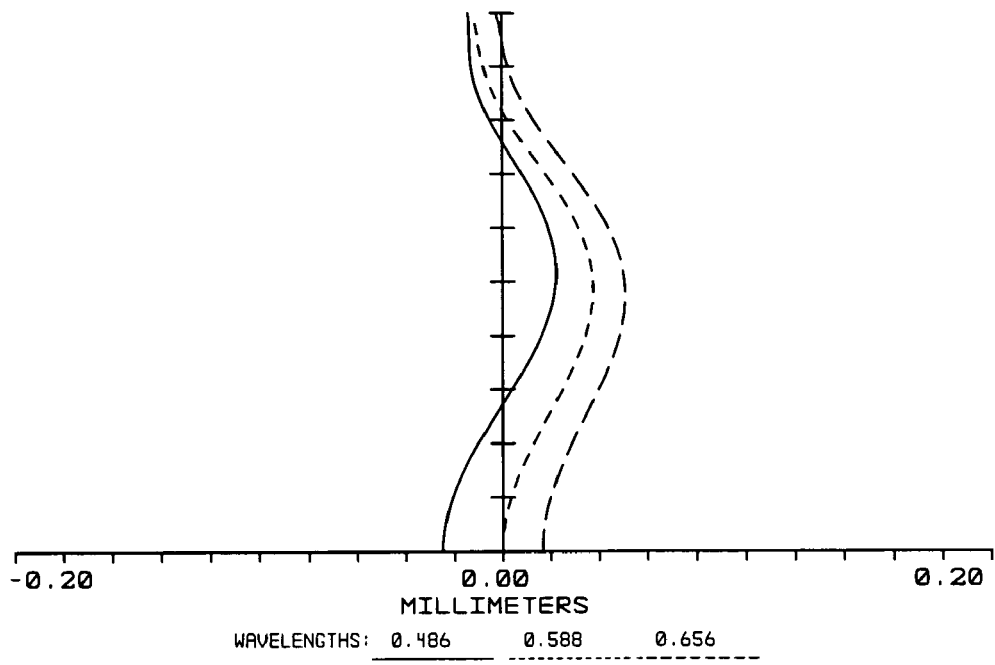
FIG. 75
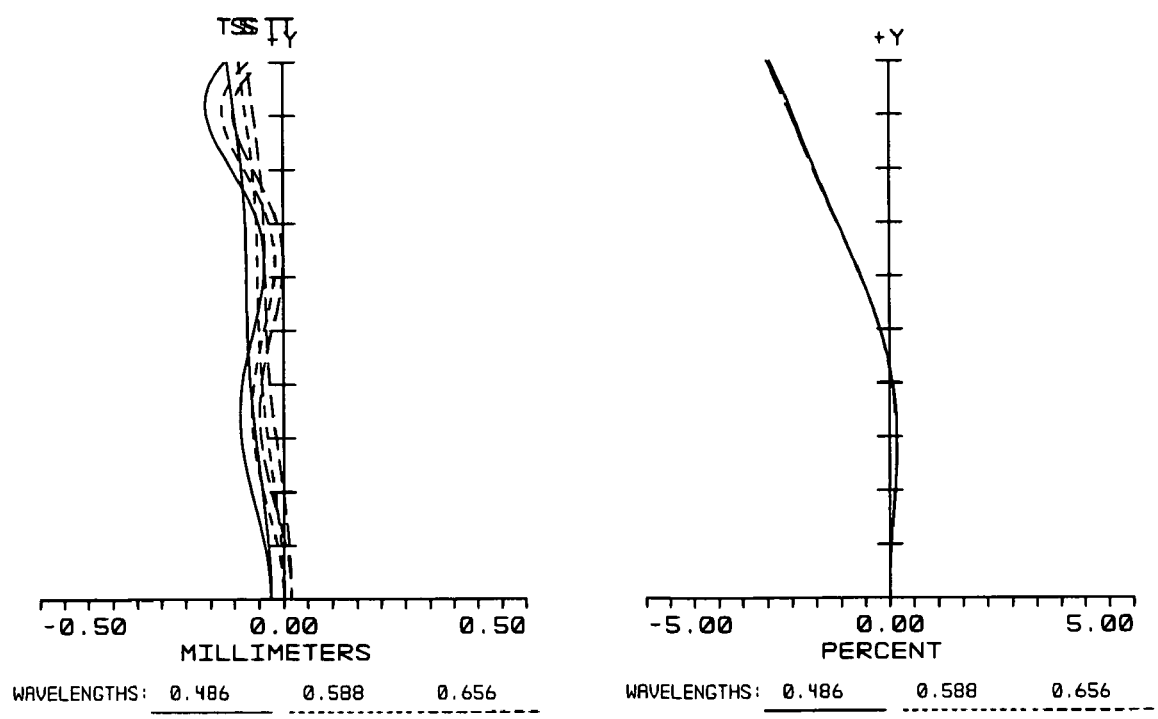
FIG. 76
FIG. 77

ZOOM LENS SYSTEM

TECHNICAL FIELD

The present invention relates to an image pick-up lens system, and more particularly to a zoom lens system being suitable for use in products such as camera modules.

BACKGROUND

In recent years, camera modules for taking photos have begun to be incorporated in portable terminals such as mobile phones and laptop computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be mass manufactured and marketed. This is accelerating the demand for downsizing of image pick-up lens systems so that they are able to be suitably used with miniaturized image pickup devices. It is also increasing expectations of cost reductions in image pick-up lens systems, commensurate with the lower costs enjoyed by modern image pickup devices. All in all, an image pick-up lens system needs to satisfy the oft-conflicting requirements of compactness, low cost, and excellent optical performance.

Compactness means in particular that a length from a lens edge of the lens system to an image pick-up surface should be as short as possible.

Low cost means in particular that the lens system should include as few lenses as possible; and that the lenses should be able to be formed from a resin or a plastic and be easily assembled.

Excellent optical performance can be classified into the following two main requirements:

First, a high brightness requirement, which means that the lens system should have a small F number (FNo.). Generally, the FNo. should be 2.8 or less.

Second, a high resolution requirement, which means that the lens system should appropriately correct fundamental aberrations such as spherical aberration, coma aberration, curvature of field, astigmatism, distortion, and chromatic aberration.

In a typical zoom camera, a collapsible zoom lens system is employed. In operation, the collapsible zoom lens system can extend out from the camera when powered up, and retract into the camera when powered off. However, lengths of different zoom lens systems are quite different according to the configurations thereof. For example, in a zoom lens system having a positive front group (the group on the object side with positive refracting power), optical elements with relative thicker thicknesses are employed to satisfy the requirements of predetermined zoom ratio and FNo. Therefore, even the zoom lens system retracted in the camera, more size reductions cannot be achievable.

In order to satisfy the low cost requirement, lenses used in a zoom lens system must be reduced. Among zoom lens systems, two group zoom lens systems are the simplest systems. In order to correct chromatic aberration, a two group zoom lens system employs at least four lenses is preferable.

A typical two group zoom lens system includes, from an object side to an image side, a positive lens group and a negative lens group. The two group zoom lens system can provide excellent optical performance, but the negative lens group is required to employ three or more lenses, which goes against the requirement of the low cost requirement.

Another typical two group zoom lens system includes, from an object side to an image side, a positive lens group and a negative lens group, each lens group employs two lenses. However, the length of the two group zoom lens system is relatively long, and the optical performance thereof is not ideal.

What is needed, therefore, is a zoom lens system which has compact size and excellent optical performance.

SUMMARY

In a preferred embodiment, a zoom lens system having an object side and an image side, comprises a negative first lens group and a positive second lens group. The first lens group comprises a meniscus-shaped first lens with negative refracting power and a second lens with positive refracting power. The first lens has a concave surface facing the image side. The second lens group comprises an aperture stop, a biconvex third lens with positive refracting power, and a meniscus-shaped fourth lens with negative refracting power. The fourth lens has a concave surface facing the object side. The first lens, the second lens, the aperture stop, the third lens and the fourth lens are coaxially disposed in that order from the object side to the image side.

Other advantages and novel features will become more apparent from the following detailed description when taken in conjunction with the accompanying drawings, in which:

BRIEF DESCRIPTION OF THE DRAWINGS

Many aspects of the present zoom lens system can be better understood with reference to the following drawings. The components in the drawings are not necessarily to scale, the emphasis instead being placed upon clearly illustrating the principles of the present zoom lens system. Moreover, in the drawings, like reference numerals designate corresponding parts throughout the several views.

FIGS. 12-14 are graphs respectively showing the longitudinal spherical aberration, and the field curvature and distortion for a zoom lens system in accordance with a second embodiment at the wide-angle end;

FIGS. 24-26 are graphs respectively showing the longitudinal spherical aberration, and the field curvature and distortion for a zoom lens system in accordance with a third embodiment at the middle-focal-length position;

FIGS. 39-41 are graphs respectively showing the longitudinal spherical aberration, and the field curvature and distortion for a zoom lens system in accordance with a fifth embodiment at the wide-angle end;

FIGS. 54-56 are graphs respectively showing the longitudinal spherical aberration, and the field curvature and distortion for a zoom lens system in accordance with a sixth embodiment at the telephoto end;

FIGS. 75-77 are graphs respectively showing the longitudinal spherical aberration, and the field curvature and distortion for a zoom lens system in accordance with a ninth embodiment at the middle-focal-length position;

The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Embodiments of the present invention will now be described in detail below and with reference to the drawings.

Figure 1:
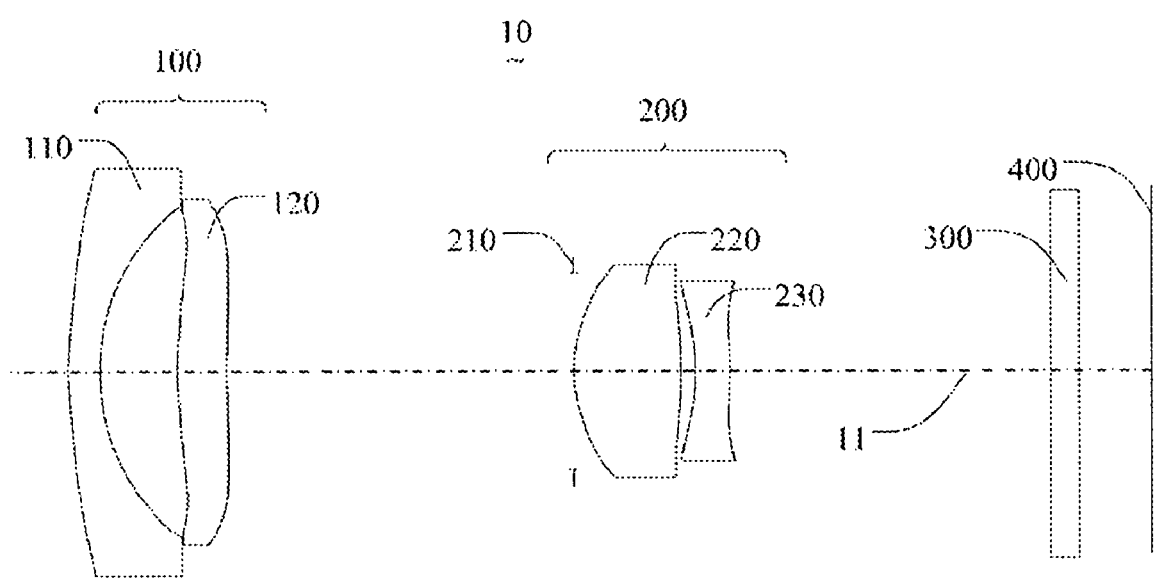
FIG. 1 is a schematic, cross-sectional view of a zoom lens system in accordance with a preferred embodiment, and also showing a filter and an image pick-up surface.

Referring to FIG. 1, a zoom lens system 10 according to a preferred embodiment is provided. The zoom lens system 10 having an object side and an image side, comprises a negative first lens group 100, a positive second lens group 200, and a filter 300. An image pick-up surface 400 of an image pickup device, such as a CCD or a CMOS, is also provided. The first lens group 100, the second lens group 200, the filter 300, and the image pick-up surface 400 are aligned in that order from the object side to the image side. The first lens group 100 comprises a meniscus-shaped first lens 110 having a concave surface facing the image side and a second lens 120 aligned in that order from the object side to the image side. The second lens group 200 comprises an aperture stop 210, a biconvex third lens 220, and a meniscus-shaped fourth lens 230 having a concave surface facing the object side. The aperture stop 210, the third lens 220 and the fourth lens 230 are aligned in that order from the object side to the image side. The first lens 110 and the fourth lens 230 have negative refracting power, the second lens 120 and the third lens 220 have positive refracting power. The filter 300 is selected from the group comprising an infrared cut absorption filter, a low-pass filter and a cover glass.

Figure 2:
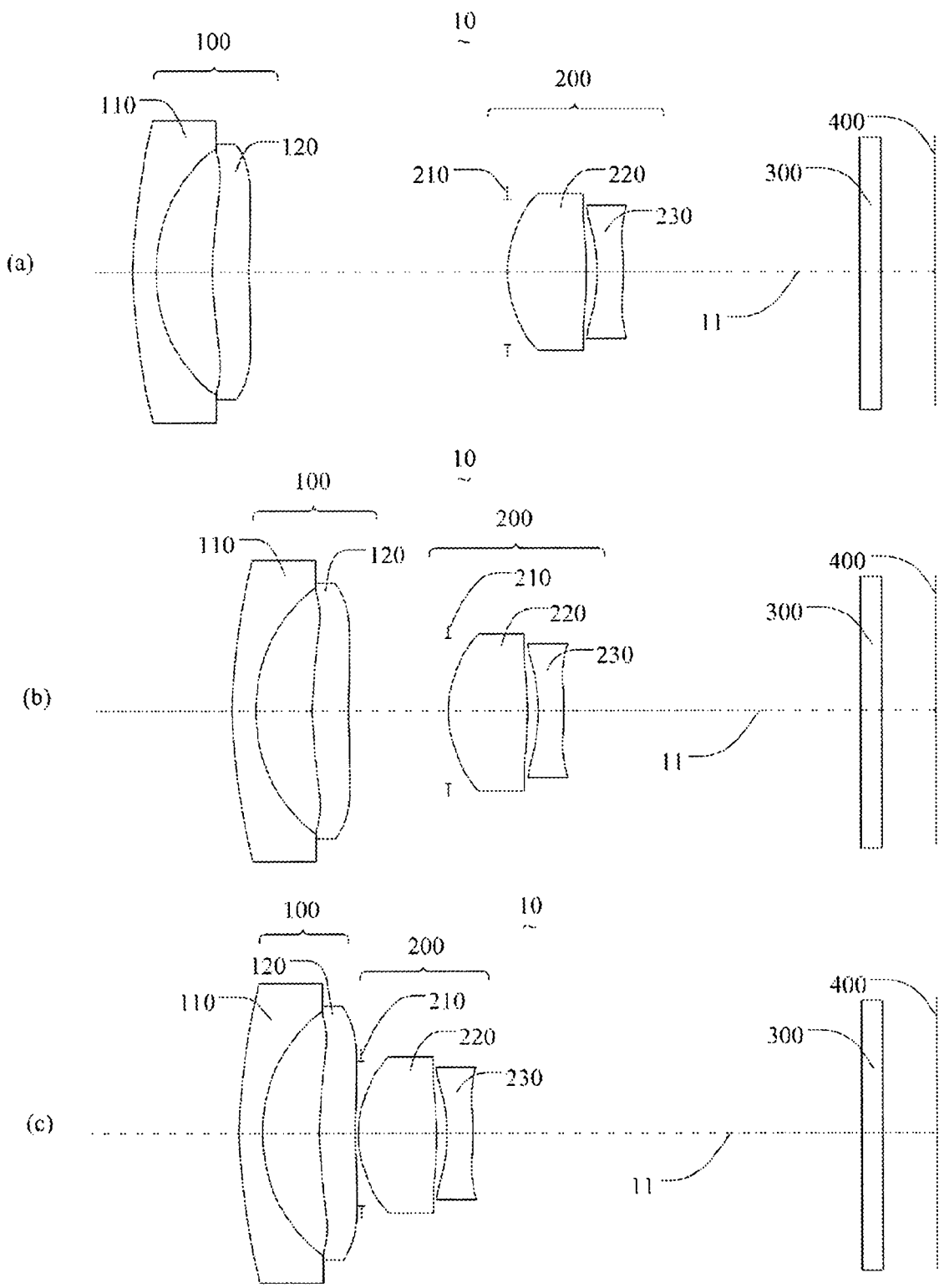
FIG. 2 illustrates schematic, cross-sectional views of the zoom lens system of FIG. 1 at a wide-angle end, a middle-focal-length position, and a telephoto end.

Referring to FIGS. 2(a)-2(c) show schematic, cross-sectional views of the zoom lens system 10 at a wide-angle end, a middle-focal-length position, and a telephoto end respectively. The first lens group 100 and the second lens group 200 are movable along an optical axis 11 of the zoom lens system 10 for zooming to thereby allow zoom lens system 10 to vary between the wide-angle end state and the telephoto end state.

In order to achieve compactness and excellent optical performance, the zoom lens system 10 satisfies the following condition:

$$3.5 < T_w/(f_w \cdot \tan \omega_w) < 7.5 \quad (1)$$

wherein, $T_w$ is a total length of the zoom lens system 10 in the optical axis 11 at the wide-angle end (from a vertex of the surface on the object side of the first lens 110 to the image pick-up surface 400), $f_w$ is a focal length of the zoom lens system 10 at the wide-angle end, and $\omega_w$ is a half angle of field of view of the zoom lens system 10 at the wide-angle end. $f_w \cdot \tan \omega_w$ is an image height on the image pick-up surface 400. In one aspect, when the ratio $T_w/(f_w \cdot \tan \omega_w)$ is above the upper limit of 7.5, the total length of the zoom lens system 10 is too long, rendering it difficult to make the zoom lens system 10 compact. In another aspect, when the ratio $T_w/(f_w \cdot \tan \omega_w)$ is below the lower limit of 3.5, the refracting power of each lens is too strong, aberrations of the system are difficult to be corrected.

Preferably, the zoom lens system 10 satisfies the following condition:

$$0.3 < d_{G1}/f_w < 0.7, \quad (2)$$

wherein, $d_{G1}$, is a thickness of the first lens group 100 (from a vertex of the surface on the object side of the first lens 110 to a vertex of the surface on the image side of the second lens 120). In one aspect, when the ratio $d_{G1}/f_w$ is above the upper limit of 0.7, the first lens group 100 is too thick, rendering it difficult to make the zoom lens system 10 compact. In another aspect, when the ratio $d_{G1}/f_w$ is below the lower limit of 0.3, the first and second lenses 110, 120 are unduly thin. Therefore, mechanical intensities of the lenses are too small, curvature of each surface in the first lens group 100 is limited, aberrations of the system are difficult to be corrected, especially for off axis aberrations, such as field curvature and astigmatism.

More preferably, the zoom lens system 10 satisfies the following condition:

$$-0.7 < \phi_1/\phi_w < -0.3, \quad (3)$$

wherein, $\phi_1$ is a refracting power of the first lens group 100, $\phi_w$, is a refracting power of the zoom lens system 10 at the wide-angle end. In one aspect, when the ratio $\phi_1/\phi_w$ is above the upper limit of −0.3, the refracting power of the first lens group 100 is too weak, although the zoom lens system 10 can be made compact, field curvature is too strong, and barrel distortion at the wide-angle end is too high. In another aspect, when the ratio $\phi_1/\phi_w$ is below the lower limit of −0.7, the refracting power of the first lens group 100 is too strong, although it is adapt to correct various aberrations, the length of the zoom lens system 10 is too long, diameters of the lenses are too large, rendering it difficult to make the zoom lens system 10 compact.

Further, the zoom lens system 10 satisfies the following condition:

$$0.5 < \phi_2/\phi_w < 0.95, \quad (4)$$

wherein, $\phi_2$ is a refracting power of the second lens group 200. In one aspect, when the ratio $\phi_2/\phi_w$ is above the upper limit of 0.95, the refracting power of the second lens group 200 is too strong, although the zoom lens system 10 can be made compact, spherical aberrations of the system are difficult to correct. In another aspect, when the ratio $\phi_2/\phi_w$ is below the lower limit of 0.5, the refracting power of the second lens group 200 is too weak, although it is adapt to correct various aberrations, the length of the zoom lens system 10 is too long, diameters of the lenses are too large, rendering it difficult to make the zoom lens system 10 compact.

In order to correct chromatic aberrations, the zoom lens system 10 satisfies the following conditions:

$$15 < v_1 - v_2 < 40, \text{ and} \quad (5)$$

$$20 < v_3 - v_4 < 40, \quad (6)$$

wherein, $v_1$, $v_2$, $v_3$, and $v_4$ are Abbe constants of the first to fourth lenses respectively. In one aspect, when the ratio $v_1 - v_2$ is above the upper limit of 40, rendering it difficult to select materials of the first and second lenses 110, 120. In another aspect, when the ratio $v_1 - v_2$ is below the lower limit of 15, the chromatic aberration of the first lens group 100 is too large for correct. In one aspect, when the ratio $v_3 - v_4$ is above the upper limit of 40, rendering it difficult to select materials of the third and fourth lenses 220, 230. In another aspect, when the ratio $v_3 - v_4$ is below the lower limit of 20, the chromatic aberration of the second lens group 200 is too large for correction.

In order to correct field curvature and distortion, the zoom lens system 10 satisfies the following condition:

$$0.3 < |(C_8 - C_9)/(C_8 + C_9)| < 0.8, \quad (1)$$

wherein, $C_8$ and $C_9$ are vertex curvatures of the two surfaces of the fourth lens 230 on the object and image sides respectively. In one aspect, when the ratio $|(C_8-C_9)/(C_8+C_9)|$ is above the upper limit of 0.8, field curvature and distortion in a positive direction of the system is too large for correct. In another aspect, when the ratio $|(C_8-C_9)/(C_8+C_9)|$ is below the lower limit of 0.3, field curvature and distortion in a negative direction of the system is too large for correction.

The above explanations outline fundamental constituent features of the various embodiment. Embodiments of the zoom lens system will be described below with reference to FIG. 3 through to FIG. 83. It is to be understood that the invention is not limited to these embodiments.

In each example, surfaces and material of each lens satisfy the data in Table 1.

TABLE 1

| | Lens group | | | | | | | |
|---|---|---|---|---|---|---|---|---|
| | First lens group | | | | Second lens group | | | |
| | Lens | | | | | | | |
| | First lens | | Second lens | | Third lens | | Fourth lens | |
| Embodiment | Aspheric | Material | Aspheric | Material | Aspheric | Material | Aspheric | Material |
| 1 | No | Glass | Yes | Glass | No | Glass | Yes | Glass |
| 2 | No | Glass | Yes | Plastic | No | Glass | Yes | Plastic |
| 3 | Yes | Glass | Yes | Glass | No | Glass | Yes | Glass |
| 4 | No | Glass | Yes | Glass | Yes | Glass | Yes | Glass |
| 5 | Yes | Glass | Yes | Plastic | No | Glass | Yes | Plastic |
| 6 | No | Glass | Yes | Plastic | Yes | Glass | Yes | Plastic |
| 7 | Yes | Glass | Yes | Glass | Yes | Glass | Yes | Glass |
| 8 | Yes | Glass | Yes | Glass | Yes | Glass | Yes | Glass |
| 9 | Yes | Glass | Yes | Plastic | Yes | Glass | Yes | Plastic | wherein, the shape of each aspheric surface is provided by a expression as follow:

$$x = \frac{cr^2}{1+\sqrt{1-c^2r^2}} + \sum A_{2i}r^{2i}$$

wherein, x is a depth from the surface to a tangent plane of a vertex of the surface, r is a height from the optical axis to the surface, c is a vertex curvature, and $A_{2i}$ are 2i-th order correction coefficients of the aspheric surface.

The following are symbols used in each exemplary embodiment.

f: focal length of the lens system
FNo: F number
ω: half angle of field of view
r: radius of curvature
d: distance between surfaces on the optical axis of the system
$n_d$: refractive index at d-line
$v_d$: Abbe number
W: wide-angle end
M: middle-focal-length position
T: telephoto end Series numbers from 1 to 4 and 6 to 11 are respectively referred to surfaces of the first lens 110, second lens 120, third lens 220, fourth lens 230, and filter 300, in that order from the object side to the image side. Series numbers 5 is referred to the aperture stop 210. $d_4$ from the surface on the image side of the second lens 120 to the aperture stop 210, $d_9$ is a distance from the surface on the image side of the fourth lens 230 to the surface on the object side of the filter 300.

In the second, fifth, sixth and ninth embodiments, the second lens 120 and the fourth lens 230 are made from a same optical plastic, for example, polycarbonate (PC).

EMBODIMENT 1

Tables 2, 3 and 4 show lens data of a zoom lens system of a first embodiment.

TABLE 2

| Surface No. | r | d | $n_d$ | $v_d$ |
|---|---|---|---|---|
| 1 | 11.707 | 0.40 | 1.72000 | 50.41 |
| 2 | 3.130 | 1.11 | | |
| 3 | 8.654 | 0.68 | 1.74840 | 27.71 |
| 4 | 18.183 | $d_4$(variable) | | |
| 5 | ∞ | 0 | | |
| 6 | 2.314 | 1.48 | 1.69673 | 56.42 |
| 7 | −15.031 | 0.21 | | |
| 8 | −2.178 | 0.48 | 1.78470 | 26.07 |
| 9 | −4.883 | $d_9$(variable) | | |
| 10 | ∞ | 0.4 | 1.52308 | 58.57 |
| 11 | ∞ | 1 | | |

TABLE 3

| Surface No. | $A_4$ | $A_6$ | $A_8$ | $A_{10}$ |
|---|---|---|---|---|
| 3 | −4.06591 × 10⁻³ | −8.07636 × 10⁻⁴ | 1.612228 × 10⁻⁴ | −2.79050 × 10⁻⁵ |
| 4 | −6.93473 × 10⁻³ | −8.58754 × 10⁻⁵ | −3.98869 × 10⁻⁵ | −5.59137 × 10⁻⁶ |
| 8 | 0.10378 | −0.018472 | 1.76742 × 10⁻³ | |
| 9 | 0.099535 | −6.71644 × 10⁻³ | 3.74188 × 10⁻³ | |

TABLE 4

| | W | M | T |
|---|---|---|---|
| f (mm) | 4.5 | 6.75 | 9 |
| Fno. | 2.8 | 4 | 5 |
| ω (°) | 32 | 22.5 | 17.5 |
| $d_4$ | 4.93 | 1.64 | 0 |
| $d_9$ | 4.49 | 5.77 | 7.05 |

Figure 3:
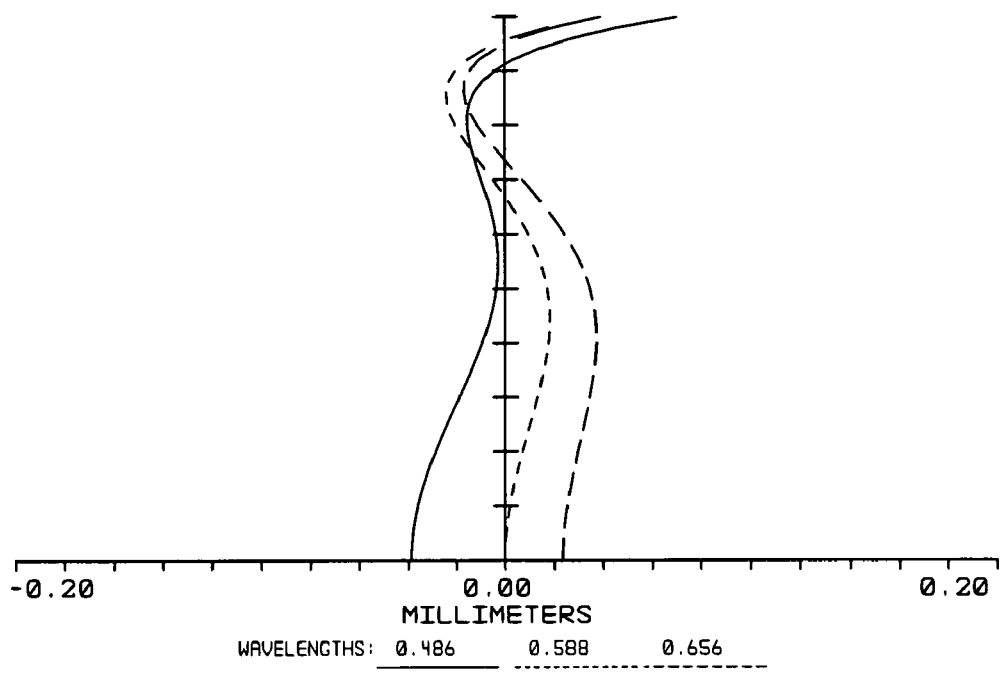
FIGS. 3-5 are graphs respectively showing the longitudinal spherical aberration, and the field curvature and distortion for a zoom lens system in accordance with a first embodiment at the wide-angle end.
Figure 4:
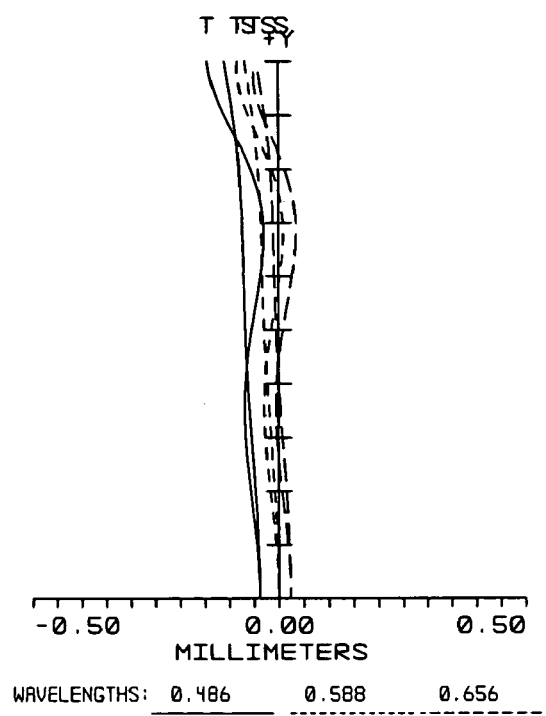
Figure 5:
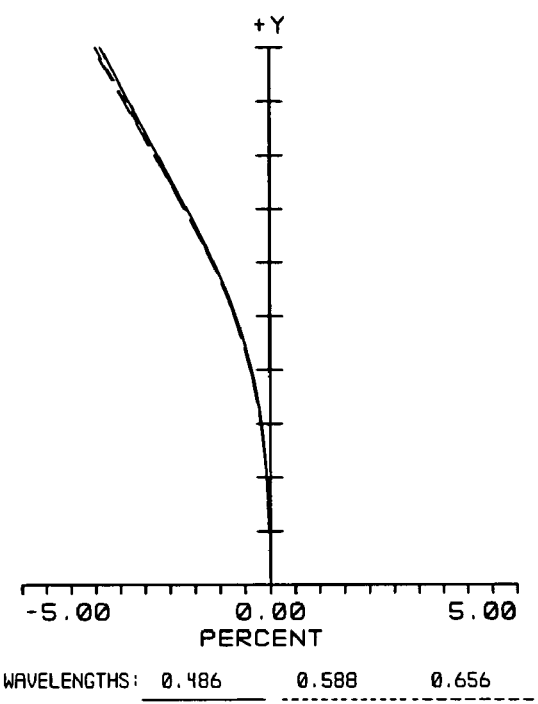
Figure 6:
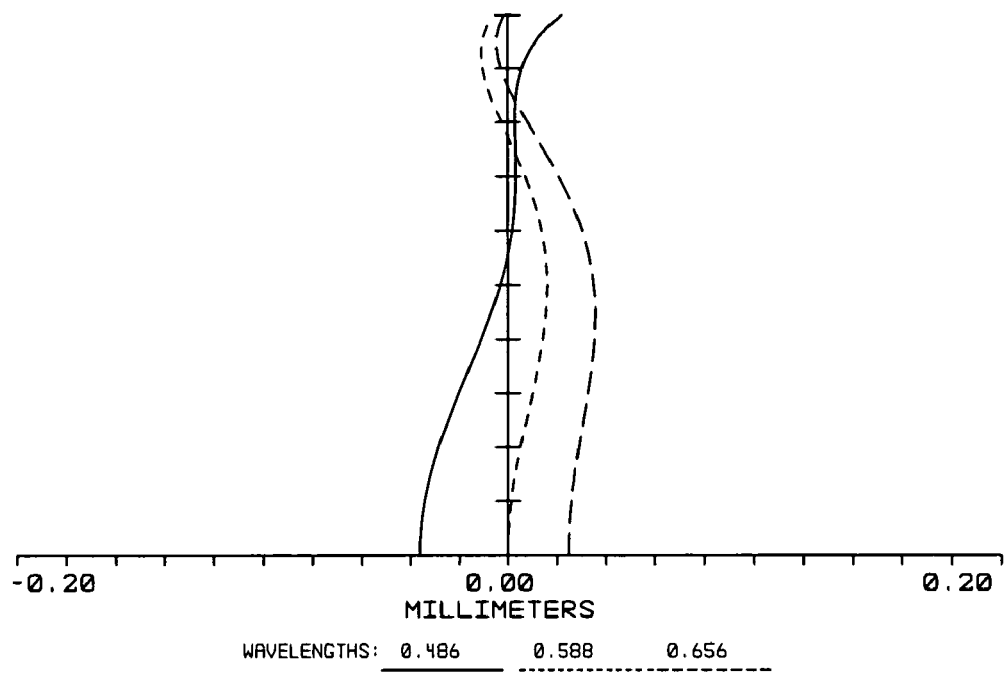
FIGS. 6-8 are graphs respectively showing the longitudinal spherical aberration, and the field curvature and distortion for a zoom lens system in accordance with a first embodiment at the middle-focal-length position.
Figure 7:
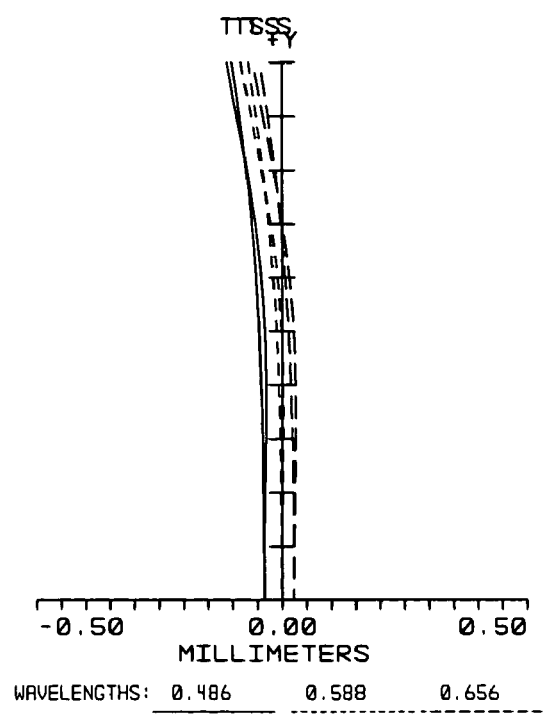
Figure 8:
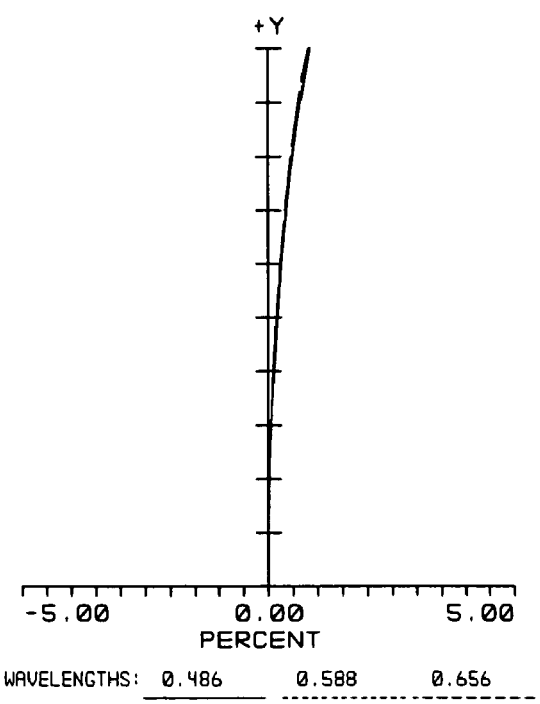
Figure 9:
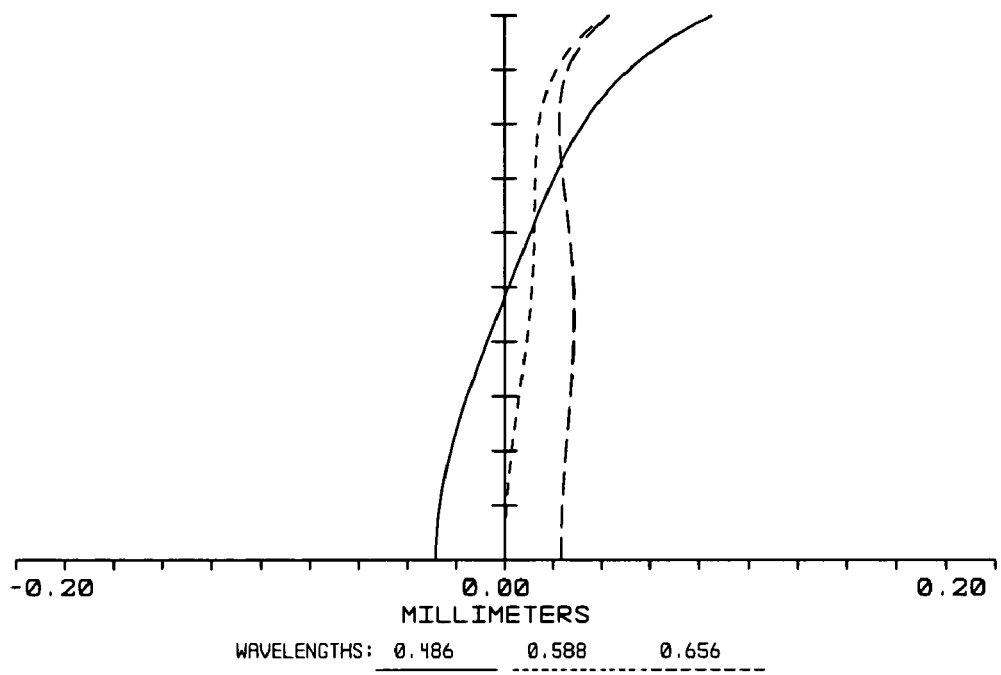
FIGS. 9-11 are graphs respectively showing the longitudinal spherical aberration, and the field curvature and distortion for a zoom lens system in accordance with a first embodiment at the telephoto end.
Figures 10, 11:
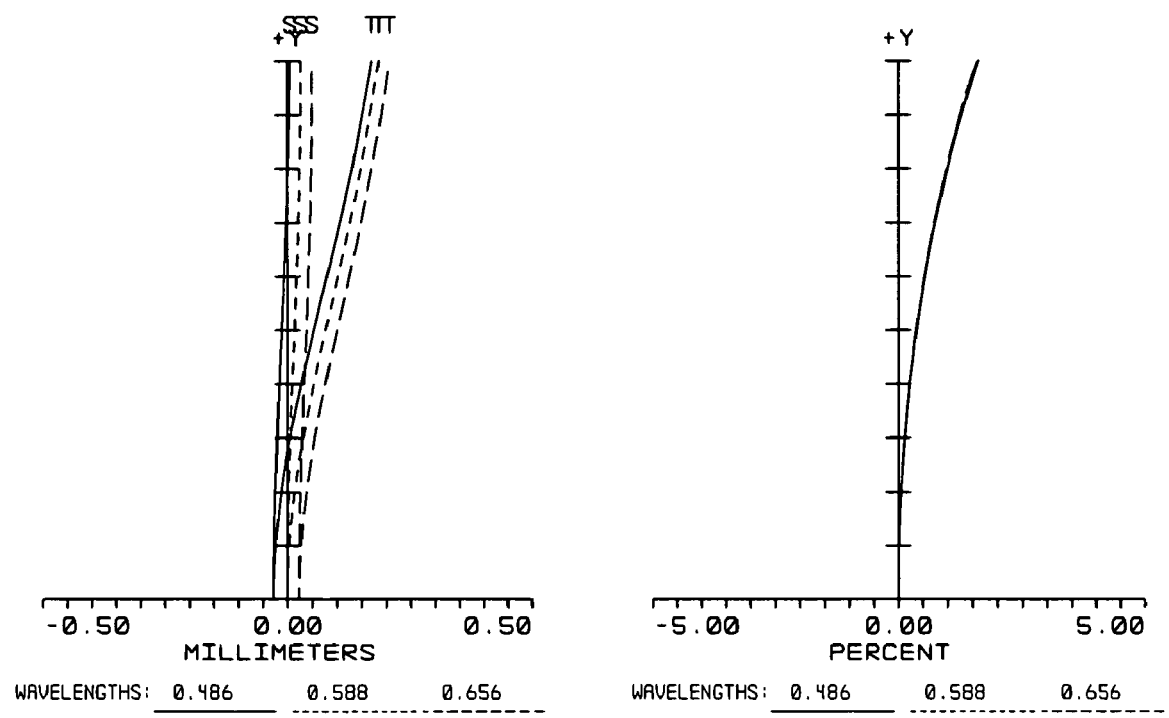

FIGS. 3-5 are graphs respectively showing the longitudinal spherical aberration, and field curvature and distortion for the zoom lens system of Embodiment 1 at the wide-angle end. FIGS. 6-8 are graphs respectively showing the longitudinal spherical aberration, and the field curvature and distortion for the zoom lens system of Embodiment 1 at the middle-focal-length position. FIGS. 9-11 are graphs respectively showing the longitudinal spherical aberration, and the field curvature and distortion for the lens system of Embodiment 1 at the telephoto position.

EMBODIMENT 2

Tables 5, 6 and 7 show lens data of a zoom lens system of a second embodiment.

TABLE 5

| Surface No. | r | d | $n_d$ | $v_d$ |
|---|---|---|---|---|
| 1 | 7.995 | 0.4 | 1.69673 | 56.42 |
| 2 | 2.885 | 1.08 | | |
| 3 | 5.901 | 0.67 | 1.58547 | 29.91 |
| 4 | 8.661 | $d_4$(variable) | | |
| 5 | ∞ | 0 | | |
| 6 | 2.305 | 1.20 | 1.64050 | 60.10 |
| 7 | −7.691 | 0.29 | | |
| 8 | −1.847 | 0.67 | 1.58547 | 29.91 |
| 9 | −4.782 | $d_9$(variable) | | |
| 10 | ∞ | 0.4 | 1.52308 | 58.57 |
| 11 | ∞ | 1 | | |

TABLE 6

| Surface No. | $A_4$ | $A_6$ | $A_8$ | $A_{10}$ |
|---|---|---|---|---|
| 3 | $-4.89009 \times 10^{-3}$ | $-1.01406 \times 10^{-3}$ | $2.16546 \times 10^{-4}$ | $-3.89653 \times 10^{-5}$ |
| 4 | $-9.23171 \times 10^{-3}$ | $6.94278 \times 10^{-5}$ | $-1.1014065 \times 10^{-4}$ | $-3.40475 \times 10^{-6}$ |
| 8 | 0.097394 | $-0.012124$ | $1.02190 \times 10^{-3}$ | $3.6711962 \times 10^{-4}$ |
| 9 | 0.088499 | $-2.64938 \times 10^{-3}$ | $1.93095 \times 10^{-3}$ | $5.5377737 \times 10^{-4}$ |

TABLE 7

|  | W | M | T |
|---|---|---|---|
| f (mm) | 4.5 | 6.75 | 9 |
| Fno. | 2.8 | 4 | 5 |
| ω (°) | 32 | 22.5 | 17.5 |
| $d_4$ | 4.81 | 1.60 | 0 |
| $d_9$ | 4.49 | 5.77 | 7.04 |

Figure 15:
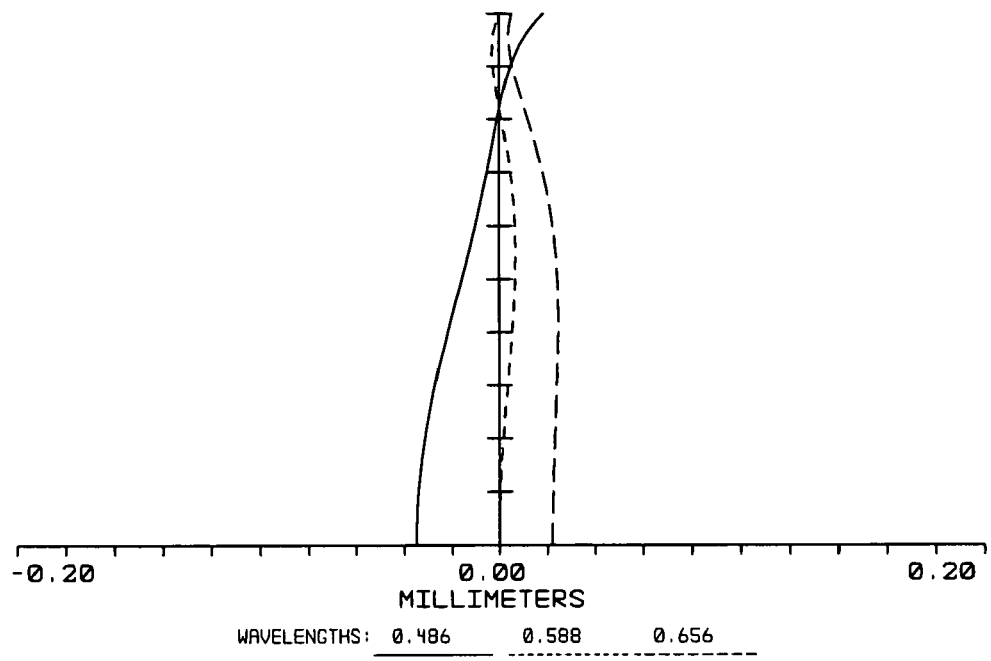
FIGS. 15-17 are graphs respectively showing the longitudinal spherical aberration, and the field curvature and distortion for a zoom lens system in accordance with a second embodiment at the middle-focal-length position.
Figures 16, 17:
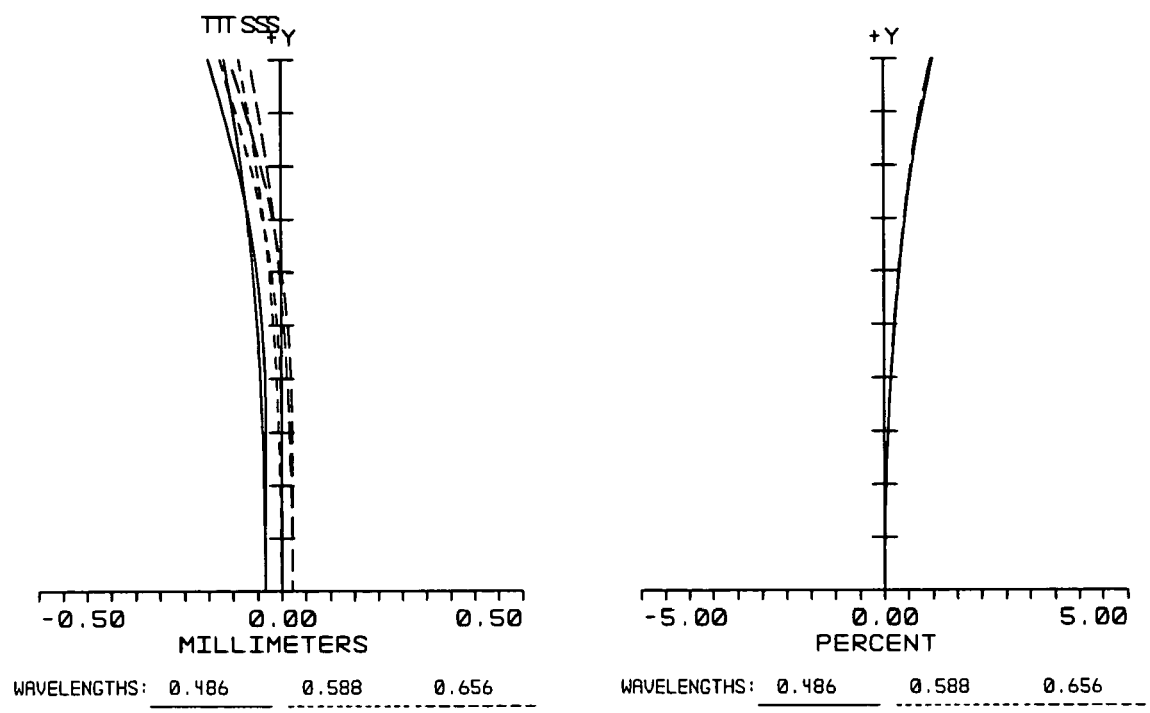
Figure 18:
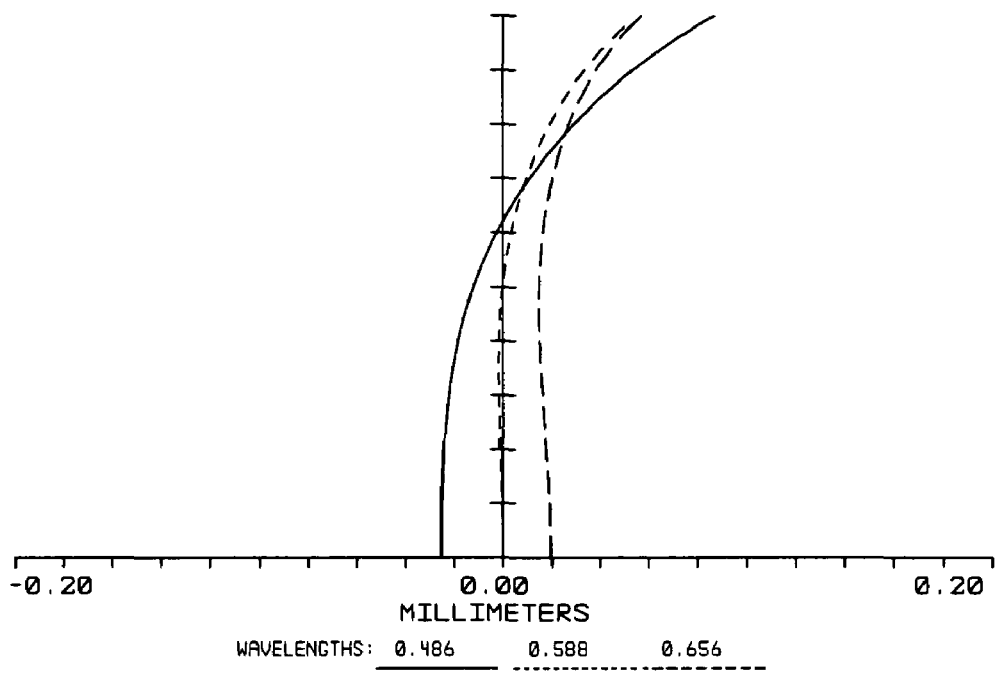
FIGS. 18-20 are graphs respectively showing the longitudinal spherical aberration, and the field curvature and distortion for a zoom lens system in accordance with a second embodiment at the telephoto end.
Figure 19:
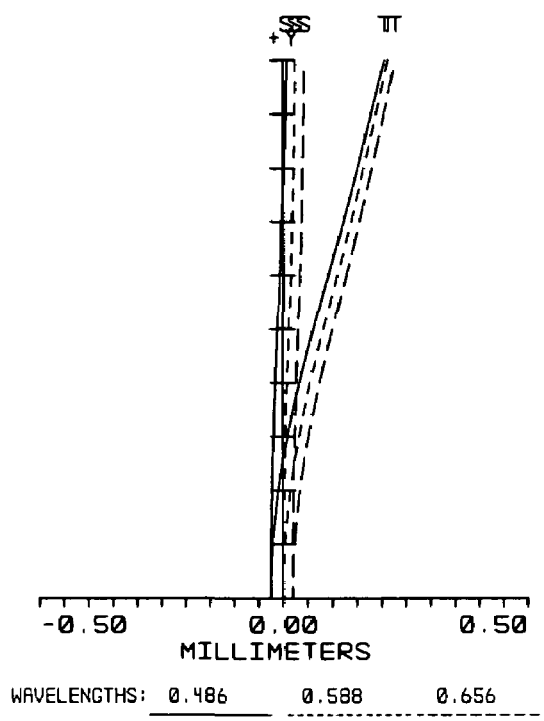
Figure 20:
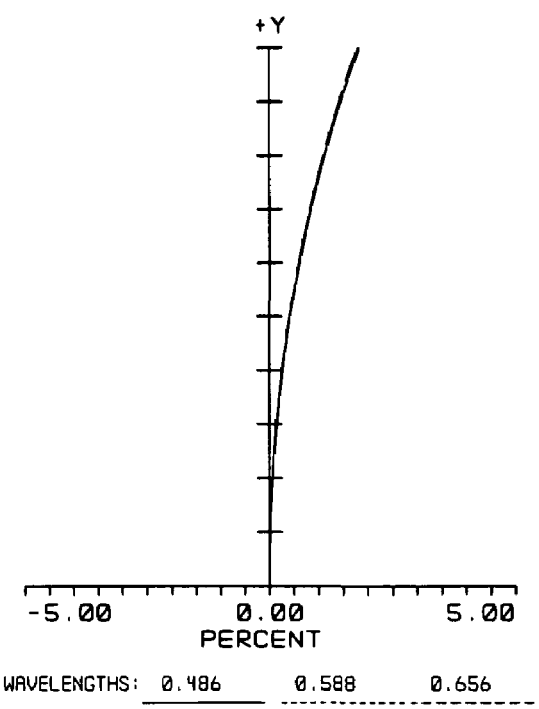

FIGS. 12-14 are graphs respectively showing the longitudinal spherical aberration, and the field curvature and distortion for the zoom lens system of Embodiment 2 at the wide-angle end. FIGS. 15-17 are graphs respectively showing the longitudinal spherical aberration, and the field curvature and distortion for the zoom lens system of Embodiment 2 at the middle-focal-length position. FIGS. 18-20 are graphs respectively showing the longitudinal spherical aberration, and the field curvature and distortion for the zoom lens system of Embodiment 2 at the telephoto position.

EMBODIMENT 3

Tables 8, 9 and 10 show lens data of a zoom lens system of a third embodiment.

TABLE 8

| Surface No. | r | d | $n_d$ | $v_d$ |
|---|---|---|---|---|
| 1 | $-11.779$ | 0.4 | 1.67790 | 55.20 |
| 2 | 6.376 | 1.13 | | |
| 3 | 7.725 | 0.61 | 1.75520 | 27.21 |
| 4 | 13.484 | $d_4$(variable) | | |
| 5 | ∞ | 0 | | |
| 6 | 2.329 | 1.42 | 1.71300 | 53.83 |
| 7 | $-16.414$ | 0.29 | | |
| 8 | $-2.381$ | 0.55 | 1.80518 | 25.36 |
| 9 | $-6.107$ | $d_9$(variable) | | |
| 10 | ∞ | 0.4 | 1.52308 | 58.57 |
| 11 | ∞ | 1 | | |

TABLE 9

| Surface No. | $A_4$ | $A_6$ | $A_8$ | $A_{10}$ |
|---|---|---|---|---|
| 1 | 0.010378 | $4.78467 \times 10^{-5}$ | $-2.81947 \times 10^{-5}$ | |
| 2 | $2.64815 \times 10^{-3}$ | $1.968774 \times 10^{-3}$ | $-5.08294 \times 10^{-5}$ | |
| 3 | $-0.023473$ | $-4.26209 \times 10^{-5}$ | $1.27839 \times 10^{-4}$ | $-2.91937 \times 10^{-6}$ |
| 4 | $-0.019523$ | $9.9286822 \times 10^{-7}$ | $1.54088 \times 10^{-4}$ | $-1.0544439 \times 10^{-5}$ |
| 8 | 0.081018 | $-0.013199$ | $1.08983 \times 10^{-3}$ | |
| 9 | 0.083572 | $-4.92438 \times 10^{-3}$ | $4.38349 \times 10^{-3}$ | |

TABLE 10

|  | W | M | T |
|---|---|---|---|
| f (mm) | 4.5 | 6.75 | 9 |
| Fno. | 2.8 | 3.8 | 4.6 |
| ω (°) | 32 | 22.5 | 17.5 |
| $d_4$ | 4.79 | 1.60 | $-2.56$ |
| $d_9$ | 4.42 | 5.72 | 7.03 |

Figure 21:
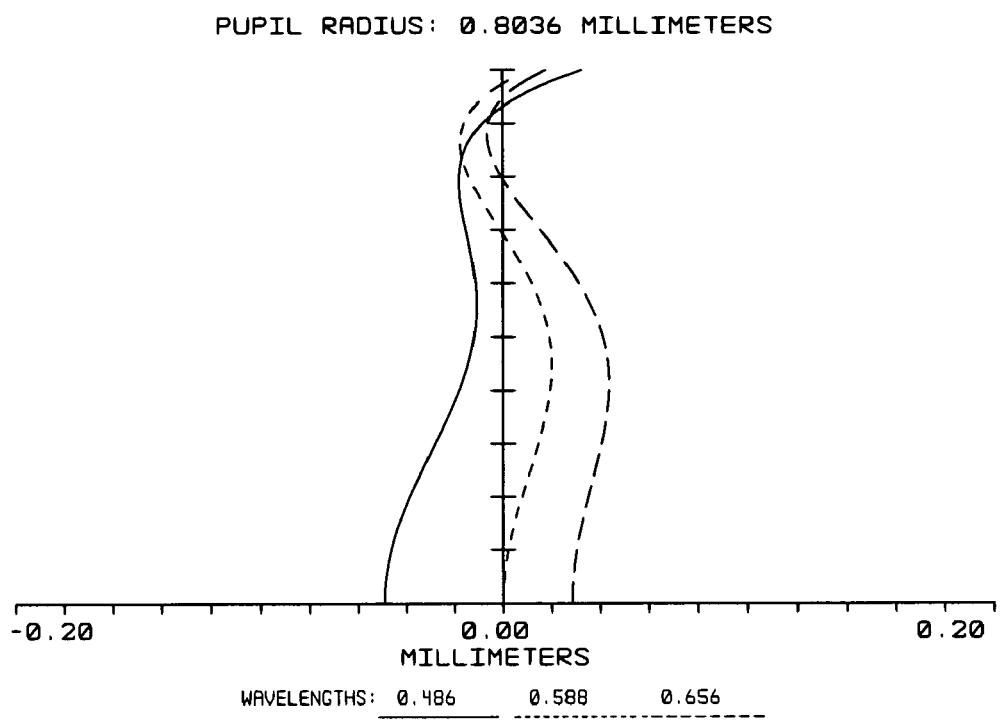
FIGS. 21-23 are graphs respectively showing the longitudinal spherical aberration, and the field curvature and distortion for a zoom lens system in accordance with a third embodiment at the wide-angle end.
Figures 22, 23:
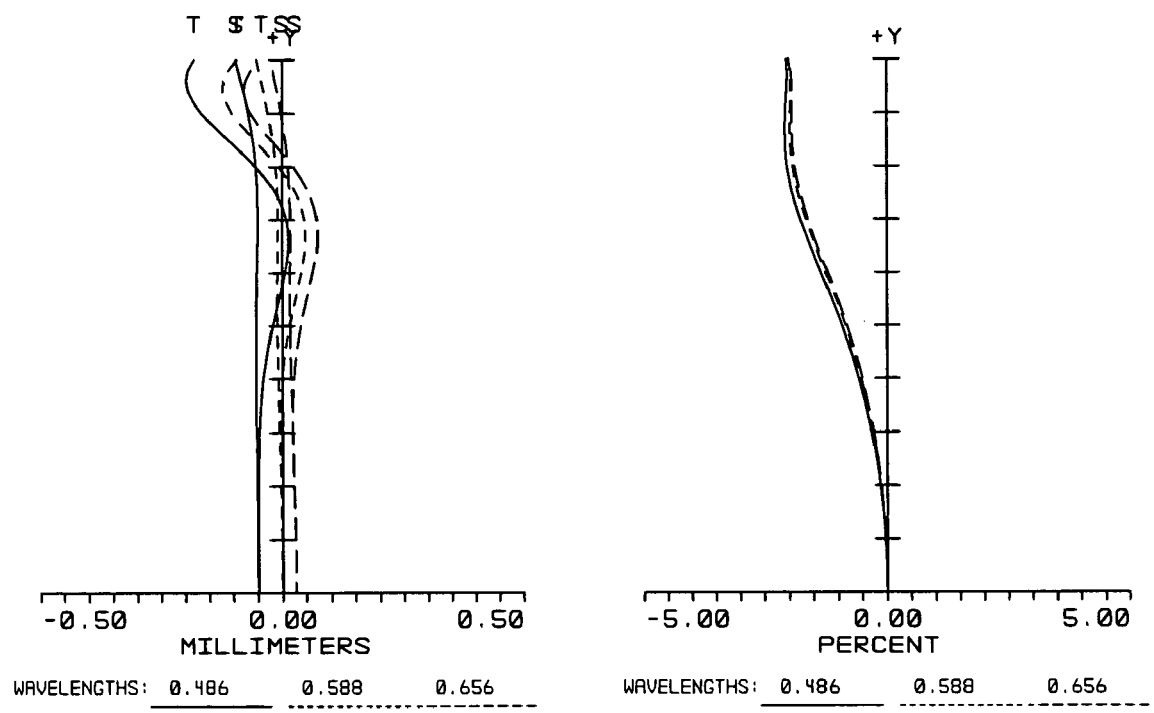
Figure 27:
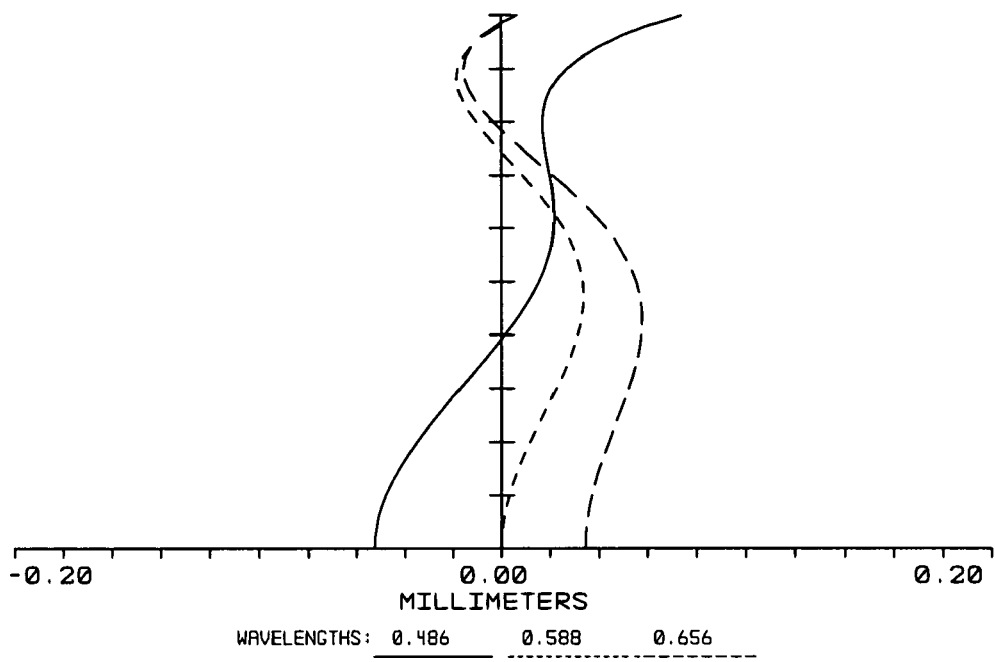
FIGS. 27-29 are graphs respectively showing the longitudinal spherical aberration, and the field curvature and distortion for a zoom lens system in accordance with a third embodiment at the telephoto end.
Figure 28:
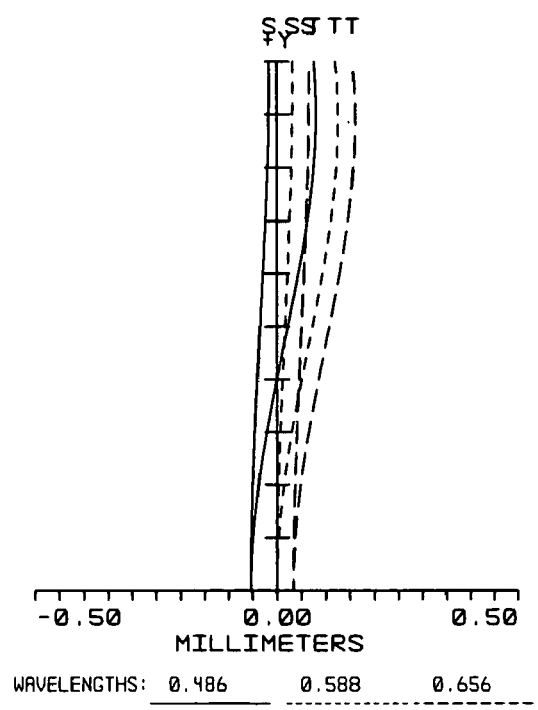
Figure 29:
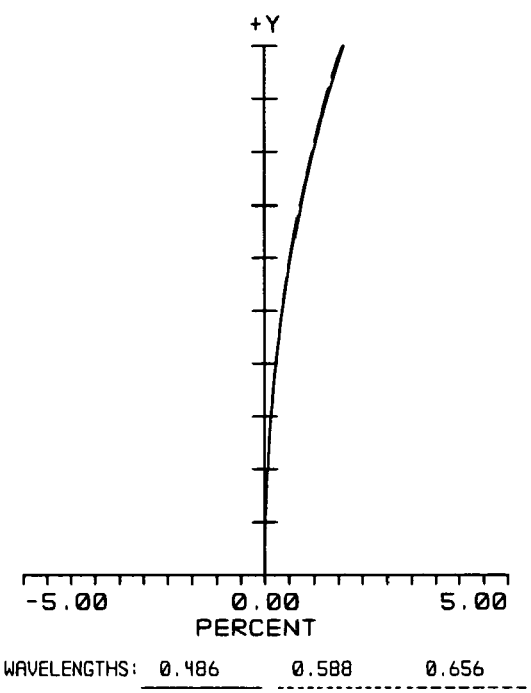

FIGS. 21-23 are graphs respectively showing the longitudinal spherical aberration, and the field curvature and distortion for the zoom lens system of Embodiment 3 at the wide-angle end. FIGS. 24-26 are graphs respectively showing the longitudinal spherical aberration, and the field curvature and distortion for the zoom lens system of Embodiment 3 at the middle-focal-length position. FIGS. 27-29 are graphs respectively showing the longitudinal spherical aberration, and the field curvature and distortion for the zoom lens system of Embodiment 3 at the telephoto position.

EMBODIMENT 4

Tables 11, 12 and 13 show lens data of a zoom lens system of a fourth embodiment.

TABLE 11

| Surface No. | r | d | $n_d$ | $v_d$ |
|---|---|---|---|---|
| 1 | 10.792 | 0.4 | 1.75398 | 52.43 |
| 2 | 3.074 | 1.17 | | |
| 3 | 8.985 | 0.68 | 1.75520 | 27.56 |
| 4 | 20.829 | $d_4$(variable) | | |
| 5 | ∞ | 0 | | |
| 6 | 2.187 | 1.27 | 1.69673 | 56.42 |
| 7 | $-18.339$ | 0.21 | | |
| 8 | $-3.085$ | 0.68 | 1.80518 | 25.36 |
| 9 | $-15.120$ | $d_9$(variable) | | |
| 10 | ∞ | 0.4 | 1.52308 | 58.57 |
| 11 | ∞ | 1 | | |

TABLE 12

| Surface No. | $A_4$ | $A_6$ | $A_8$ | $A_{10}$ |
|---|---|---|---|---|
| 3 | $-3.52464 \times 10^{-3}$ | $-5.26442 \times 10^{-4}$ | $1.60681 \times 10^{-4}$ | $-3.40622 \times 10^{-5}$ |
| 4 | $-6.88161 \times 10^{-3}$ | $4.72950 \times 10^{-4}$ | $-1.416056 \times 10^{-4}$ | $-2.16651 \times 10^{-6}$ |
| 6 | $-5.66322 \times 10^{-3}$ | $5.91466 \times 10^{-3}$ | $-2.71534 \times 10^{-3}$ | $5.88739 \times 10^{-4}$ |
| 7 | $-8.10150 \times 10^{-3}$ | $2.04669 \times 10^{-2}$ | $-3.48009 \times 10^{-3}$ | $-1.45236 \times 10^{-3}$ |
| 8 | $4.85359 \times 10^{-2}$ | $1.68766 \times 10^{-2}$ | $-9.59511 \times 10^{-3}$ | $-3.2613383 \times 10^{-4}$ |
| 9 | $6.25605 \times 10^{-2}$ | $1.85125 \times 10^{-2}$ | $-1.04580 \times 10^{-2}$ | $3.46141 \times 10^{-3}$ |

TABLE 13

|  | W | M | T |
|---|---|---|---|
| f (mm) | 4.5 | 6.75 | 9 |
| Fno. | 2.8 | 3.8 | 4.6 |
| ω (°) | 32 | 22.5 | 17.5 |
| $d_4$ | 4.76 | 1.59 | 0 |
| $d_9$ | 4.44 | 5.73 | 7.03 |

TABLE 16

|  | W | M | T |
|---|---|---|---|
| f (mm) | 4.5 | 6.75 | 9 |
| Fno. | 2.8 | 3.8 | 4.6 |
| ω (°) | 32 | 22.5 | 17.5 |
| $d_4$ | 4.83 | 1.62 | 0.02 |
| $d_9$ | 4.50 | 5.77 | 7.05 |

Figure 30:
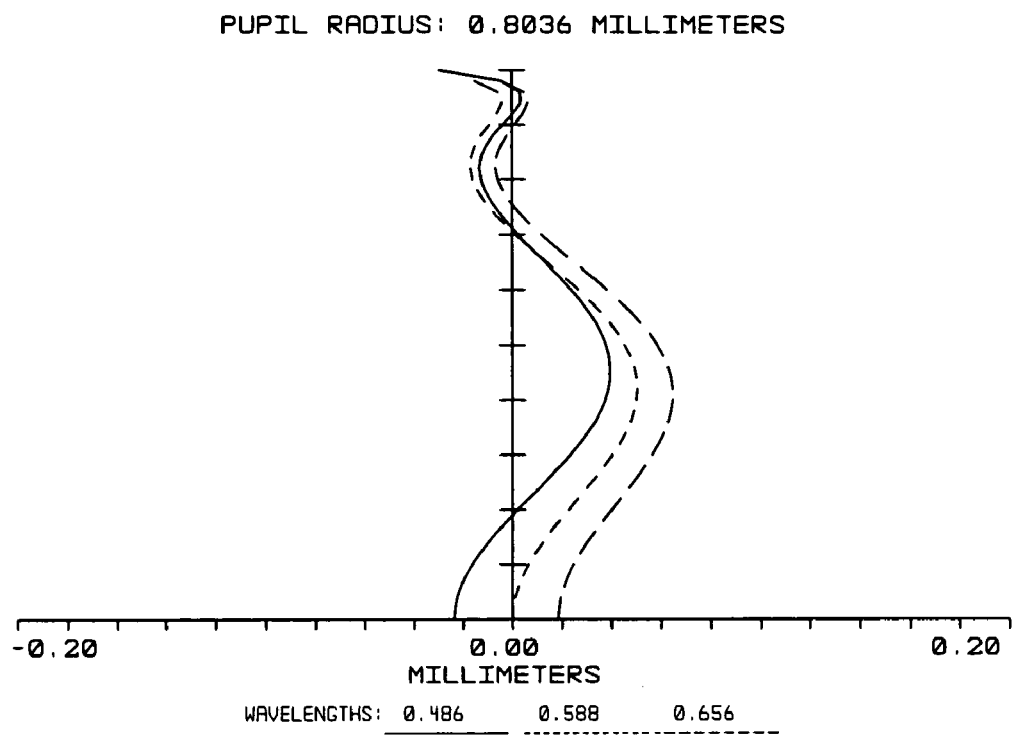
FIGS. 30-32 are graphs respectively showing the longitudinal spherical aberration, and the field curvature and distortion for a zoom lens system in accordance with a fourth embodiment at the wide-angle end.
Figures 31, 32:
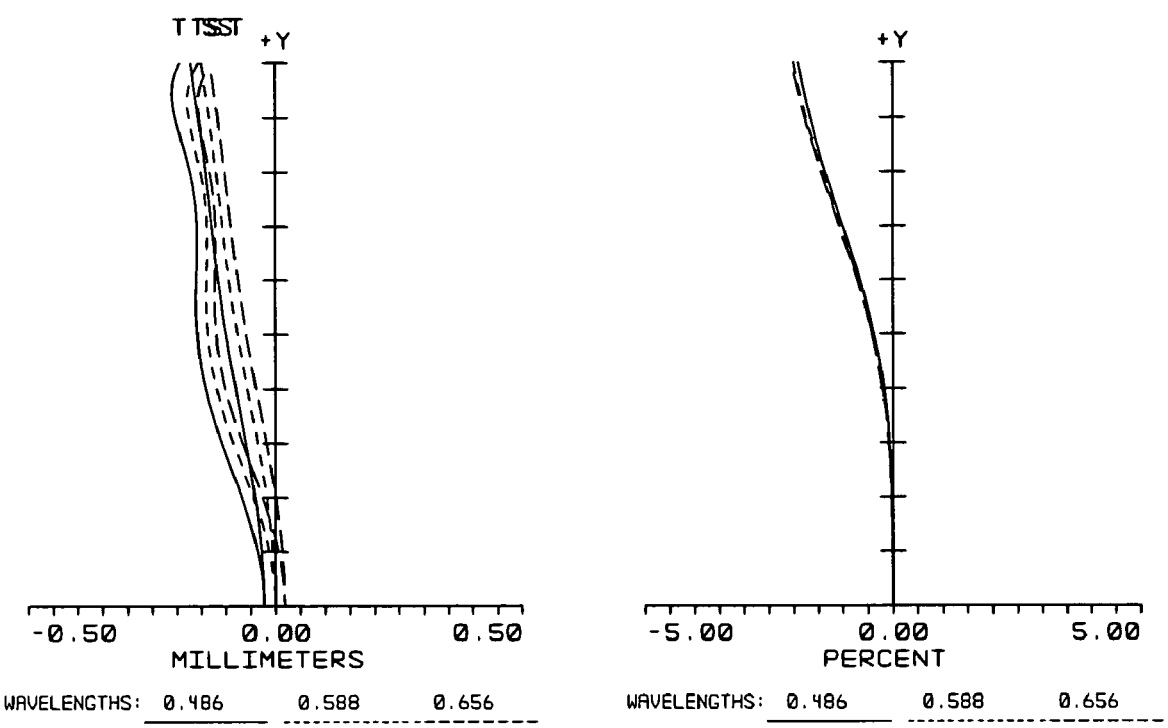
Figure 33:
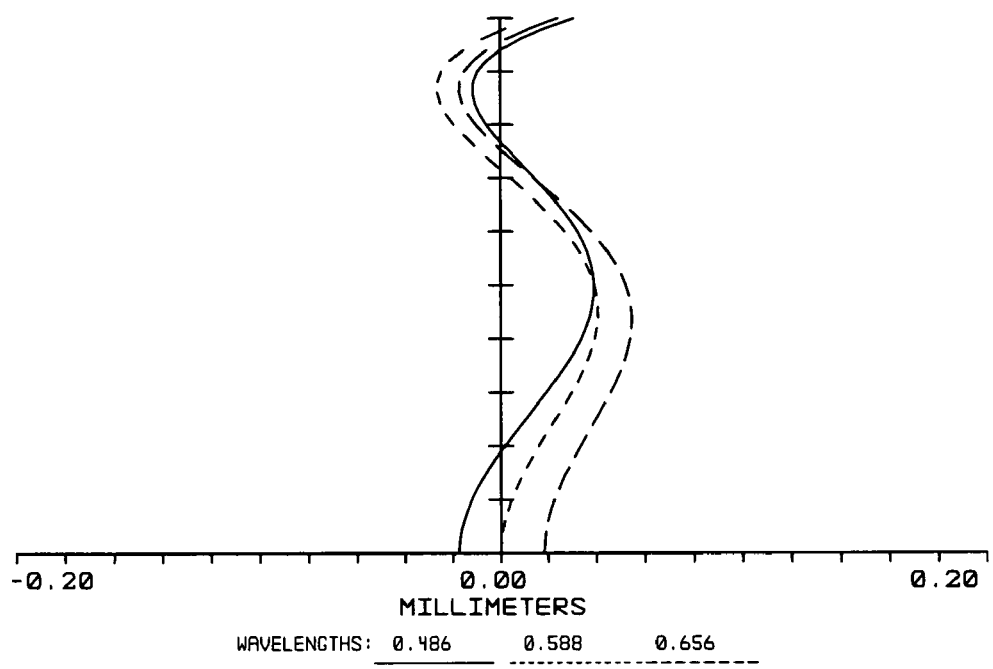
FIGS. 33-35 are graphs respectively showing the longitudinal spherical aberration, and the field curvature and distortion for a zoom lens system in accordance with a fourth embodiment at the middle-focal-length position.
Figure 34:
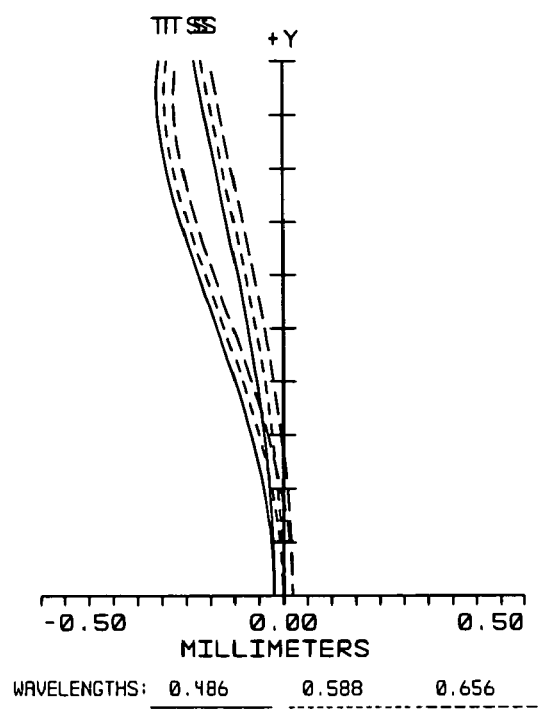
Figure 35:
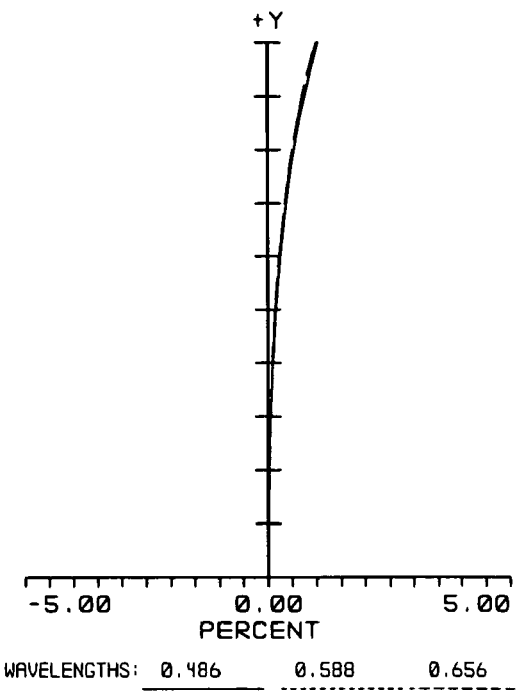
Figure 36:
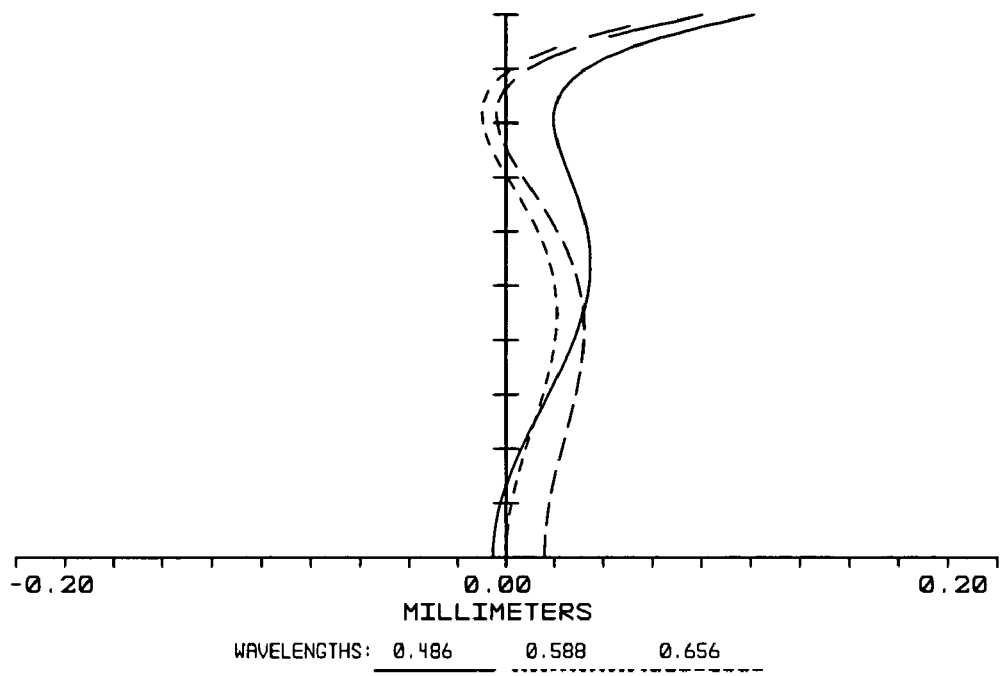
FIGS. 36-38 are graphs respectively showing the longitudinal spherical aberration, and the field curvature and distortion for a zoom lens system in accordance with a fourth embodiment at the telephoto end.
Figure 37:
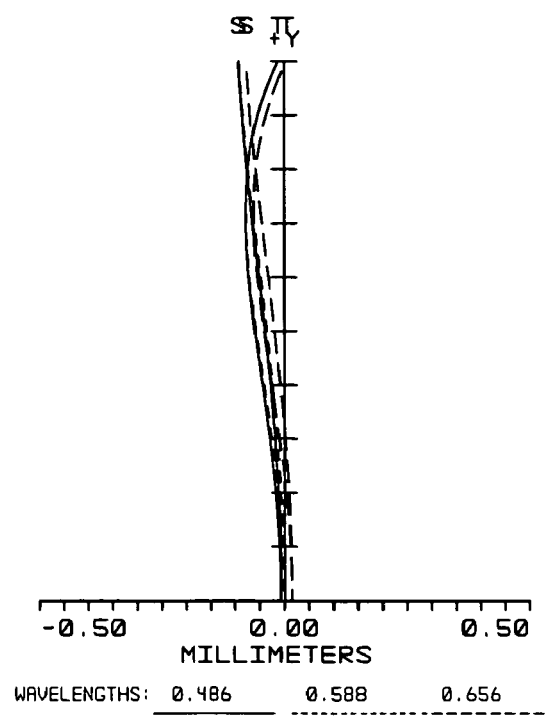
Figure 38:
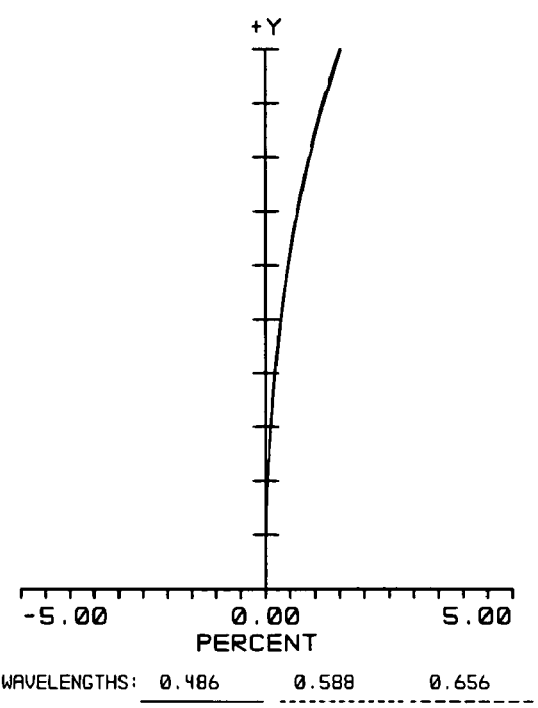

FIGS. 30-32 are graphs respectively showing the longitudinal spherical aberration, and the field curvature and distortion for the zoom lens system of Embodiment 4 at the wide-angle end. FIGS. 33-35 are graphs respectively showing the longitudinal spherical aberration, and the field curvature and distortion for the zoom lens system of Embodiment 4 at the middle-focal-length position. FIGS. 36-38 are graphs respectively showing the longitudinal spherical aberration, and the field curvature and distortion for the zoom lens system of Embodiment 4 at the telephoto position.

Figure 42:
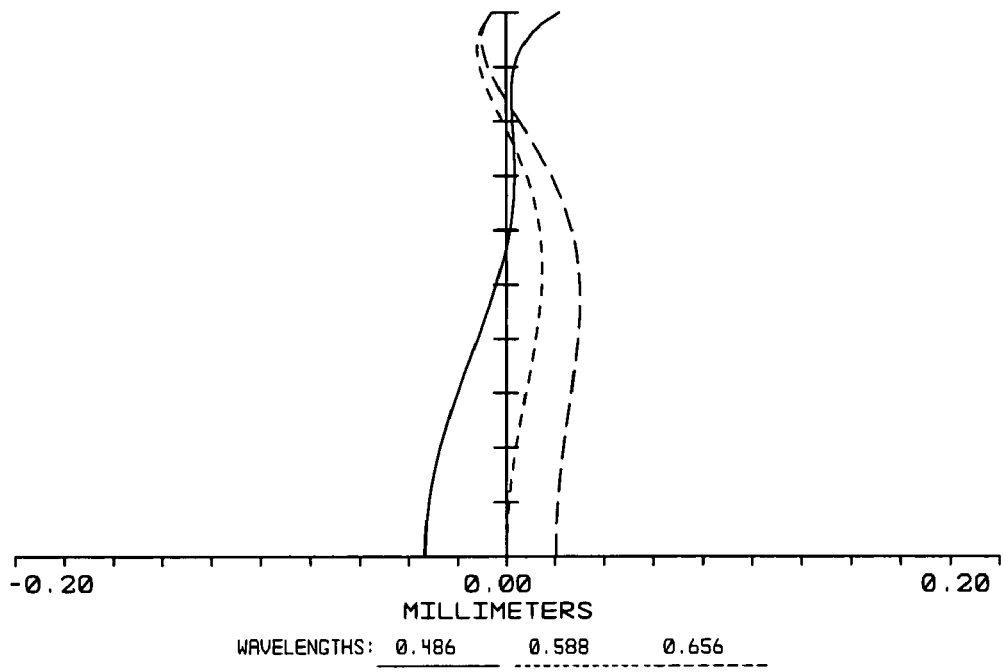
FIGS. 42-44 are graphs respectively showing the longitudinal spherical aberration, and the field curvature and distortion for a zoom lens system in accordance with a fifth embodiment at the middle-focal-length position.
Figure 43:
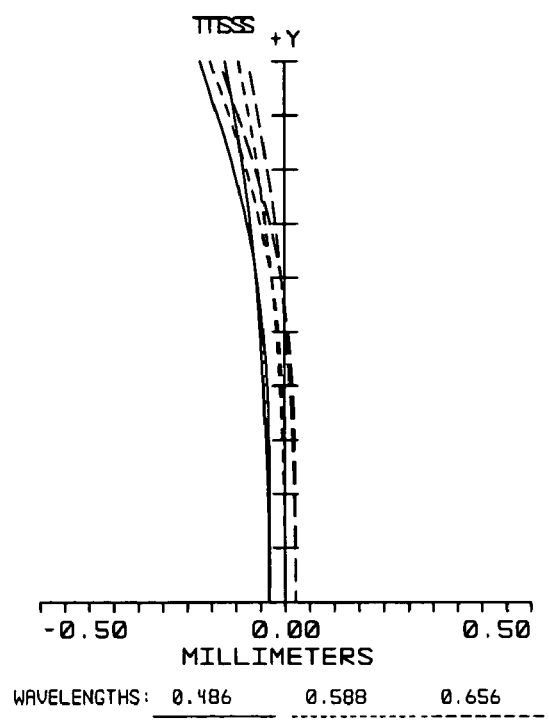
Figure 44:
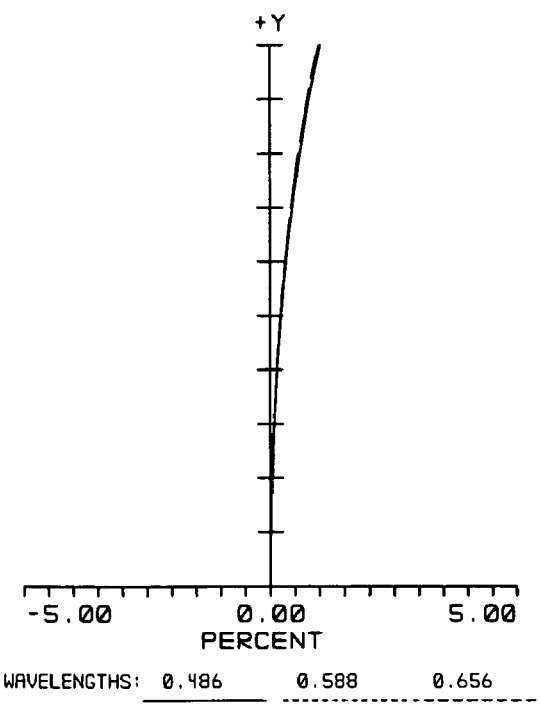
Figure 45:
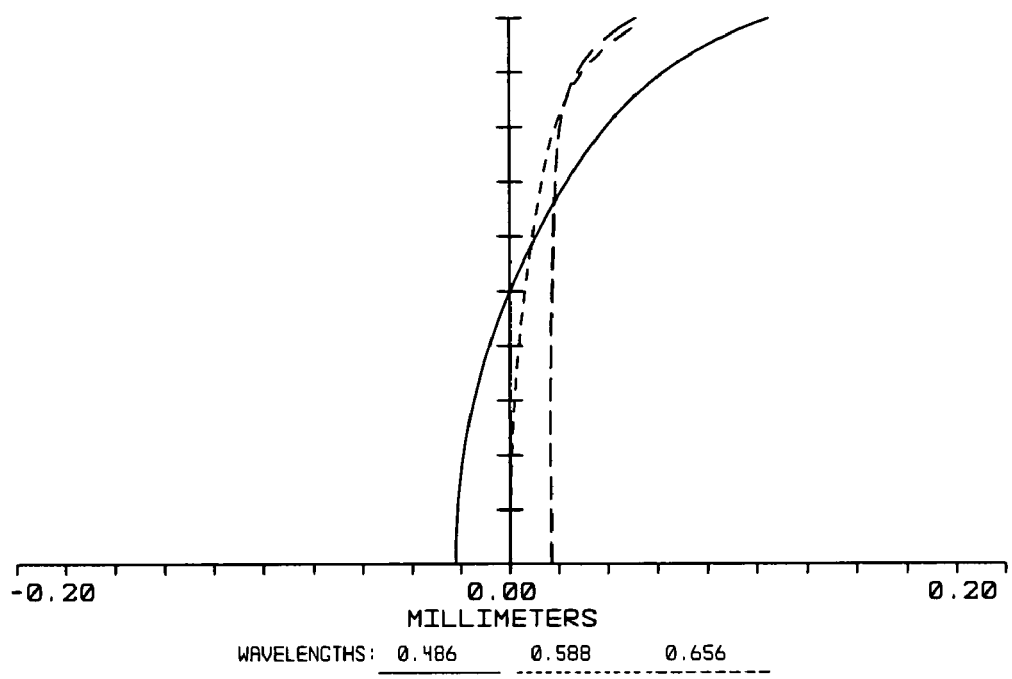
FIGS. 45-47 are graphs respectively showing the longitudinal spherical aberration, and the field curvature and distortion for a zoom lens system in accordance with a fifth embodiment at the telephoto end.
Figure 46:
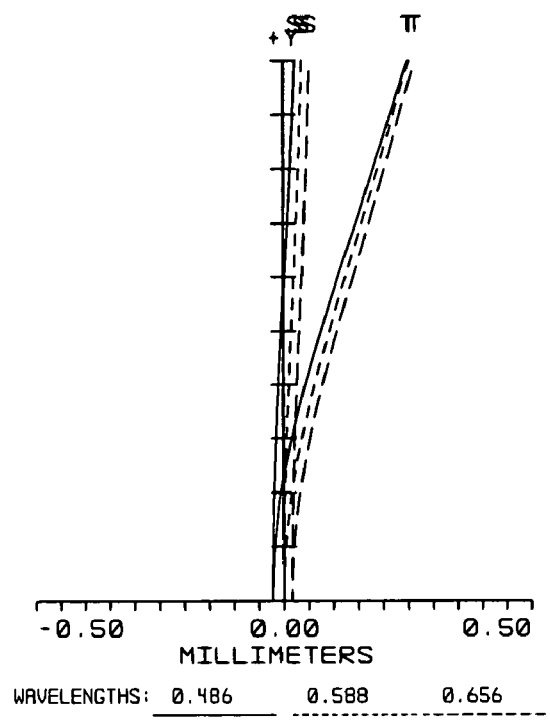
Figure 47:
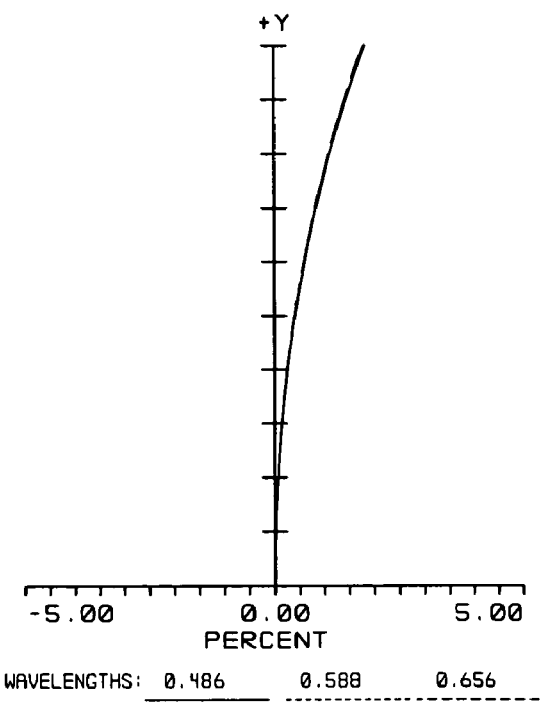

FIGS. 39-41 are graphs respectively showing the longitudinal spherical aberration, and the field curvature and distortion for the zoom lens system of Embodiment 5 at the wide-angle end. FIGS. 42-44 are graphs respectively showing the longitudinal spherical aberration, and the field curvature and distortion for the zoom lens system of Embodiment 5 at the middle-focal-length position. FIGS. 45-47 are graphs respectively showing the longitudinal spherical aberration, and the field curvature and distortion for the zoom lens system of Embodiment 5 at the telephoto position.

EMBODIMENT 5

Tables 14, 15 and 16 show lens data of a zoom lens system of a fifth embodiment.

EMBODIMENT 6

Tables 17, 18 and 19 show lens data of a zoom lens system of a sixth embodiment.

TABLE 14

| Surface No. | r | d | $n_d$ | $v_d$ |
|---|---|---|---|---|
| 1 | 8.193 | 0.4 | 1.69680 | 55.41 |
| 2 | 2.919 | 1.06 |  |  |
| 3 | 5.876 | 0.67 | 1.58547 | 29.91 |
| 4 | 8.557 | $d_4$(variable) |  |  |
| 5 | ∞ | 0.02 |  |  |
| 6 | 2.281 | 1.19 | 1.64049 | 60.10 |
| 7 | -8.001 | 0.28 |  |  |
| 8 | -1.861 | 0.66 | 1.58547 | 29.91 |
| 9 | -4.882 | $d_9$(variable) |  |  |
| 10 | ∞ | 0.4 | 1.52308 | 58.57 |
| 11 | ∞ | 1 |  |  |

TABLE 17

| Surface No. | r | d | $n_d$ | $v_d$ |
|---|---|---|---|---|
| 1 | 8.124 | 0.4 | 1.69673 | 56.42 |
| 2 | 2.912 | 1.07 |  |  |
| 3 | 6.153 | 0.67 | 1.58547 | 29.91 |
| 4 | 9.091 | $d_4$(variable) |  |  |
| 5 | ∞ | 0.02 |  |  |
| 6 | 2.287 | 1.14 | 1.64049 | 60.10 |
| 7 | -7.666 | 0.29 |  |  |
| 8 | -1.880 | 0.65 | 1.58547 | 29.91 |
| 9 | -5.165 | 4.51 |  |  |
| 10 | ∞ | 0.4 | 1.52308 | 58.57 |
| 11 | ∞ | 1 |  |  |

TABLE 15

| Surface No. | $A_4$ | $A_6$ | $A_8$ | $A_{10}$ |
|---|---|---|---|---|
| 1 | $1.83299 \times 10^{-5}$ | $7.62159 \times 10^{-7}$ | $8.57154 \times 10^{-8}$ | $3.54067 \times 10^{-8}$ |
| 2 | $-3.52610 \times 10^{-5}$ | $-4.26707 \times 10^{-6}$ | $-2.12231 \times 10^{-8}$ | $-9.57468 \times 10^{-9}$ |
| 3 | $-4.83284 \times 10^{-3}$ | $-1.01485 \times 10^{-3}$ | $2.20115 \times 10^{-4}$ | $-3.75681 \times 10^{-5}$ |
| 4 | $-9.2694204 \times 10^{-3}$ | $1.22739 \times 10^{-4}$ | $-1.03784 \times 10^{-4}$ | $-3.49025 \times 10^{-6}$ |
| 8 | $9.70847 \times 10^{-2}$ | $-1.16739 \times 10^{-2}$ | $7.21052 \times 10^{-4}$ | $3.92580 \times 10^{-4}$ |
| 9 | $9.00230 \times 10^{-2}$ | $-3.05674 \times 10^{-3}$ | $2.34376 \times 10^{-3}$ | $6.43948 \times 10^{-4}$ |

TABLE 18

| Surface No. | $A_4$ | $A_6$ | $A_8$ | $A_{10}$ |
|---|---|---|---|---|
| 3 | $-4.74847 \times 10^{-3}$ | $-1.01682 \times 10^{-3}$ | $2.205662 \times 10^{-4}$ | $-3.78321 \times 10^{-5}$ |
| 4 | $-9.31892 \times 10^{-3}$ | $1.31424 \times 10^{-4}$ | $-1.02552 \times 10^{-4}$ | $-4.07043 \times 10^{-6}$ |
| 6 | $-1.86027 \times 10^{-3}$ | $6.54821 \times 10^{-4}$ | $-6.68835 \times 10^{-4}$ | $-6.33099 \times 10^{-5}$ |
| 7 | $-1.54445 \times 10^{-3}$ | $4.313170 \times 10^{-5}$ | $-1.54587 \times 10^{-4}$ | $-2.63634 \times 10^{-3}$ |
| 8 | $9.89776 \times 10^{-2}$ | $-1.09875 \times 10^{-2}$ | $5.79226 \times 10^{-4}$ | $5.272047 \times 10^{-4}$ |
| 9 | $9.23783 \times 10^{-2}$ | $-2.62719 \times 10^{-3}$ | $3.48851 \times 10^{-3}$ | $-9.45732 \times 10^{-5}$ |

TABLE 19

| | W | M | T |
|---|---|---|---|
| f (mm) | 4.5 | 6.75 | 9 |
| Fno. | 2.8 | 3.8 | 4.6 |
| ω (°) | 32 | 22.5 | 17.5 |
| $d_4$ | 4.81 | 1.62 | 0.02 |
| $d_9$ | 4.51 | 5.79 | 7.07 |

TABLE 22

| | W | M | T |
|---|---|---|---|
| f (mm) | 4.5 | 6.75 | 9 |
| Fno. | 3 | 3.8 | 4.6 |
| ω (°) | 32 | 22.5 | 17.5 |
| $d_4$ | 6.22 | 2.41 | 0.50 |
| $d_9$ | 4.80 | 6.15 | 7.50 |

Figure 48:
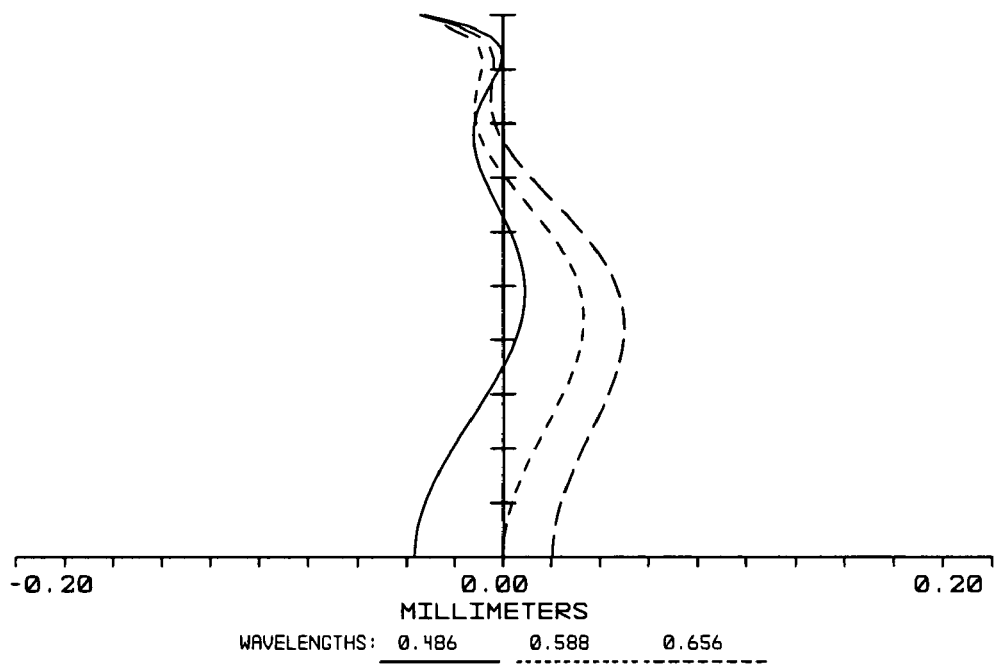
FIGS. 48-50 are graphs respectively showing the longitudinal spherical aberration, and the field curvature and distortion for a zoom lens system in accordance with a sixth embodiment at the wide-angle end.
Figure 49:
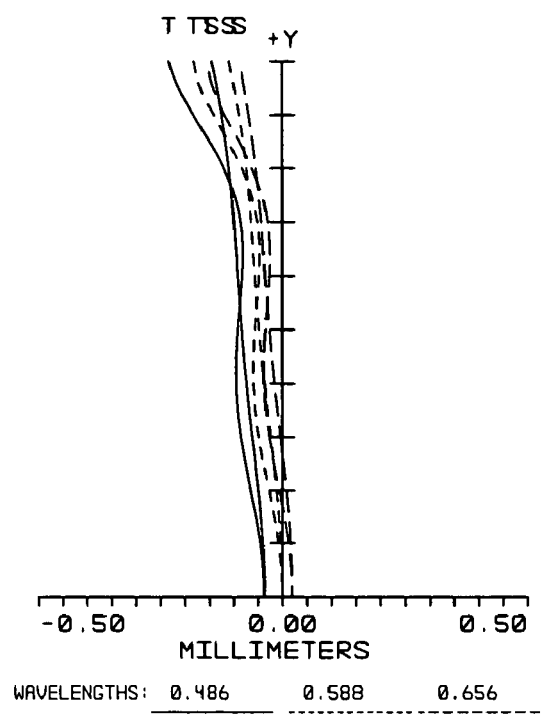
Figure 50:
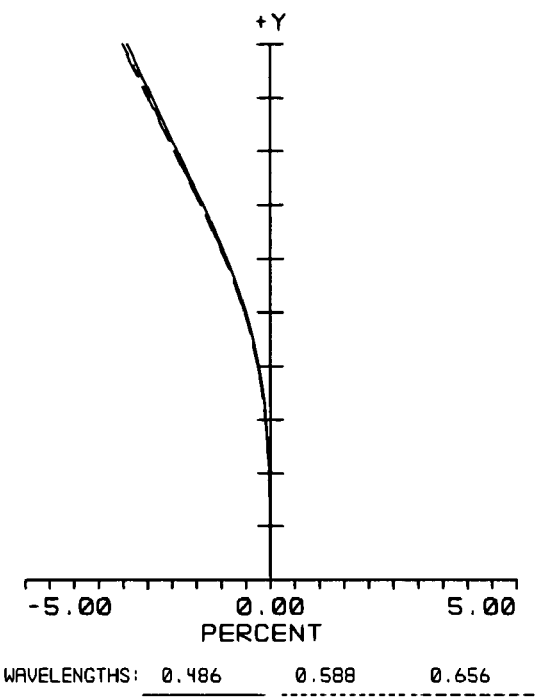
Figure 51:
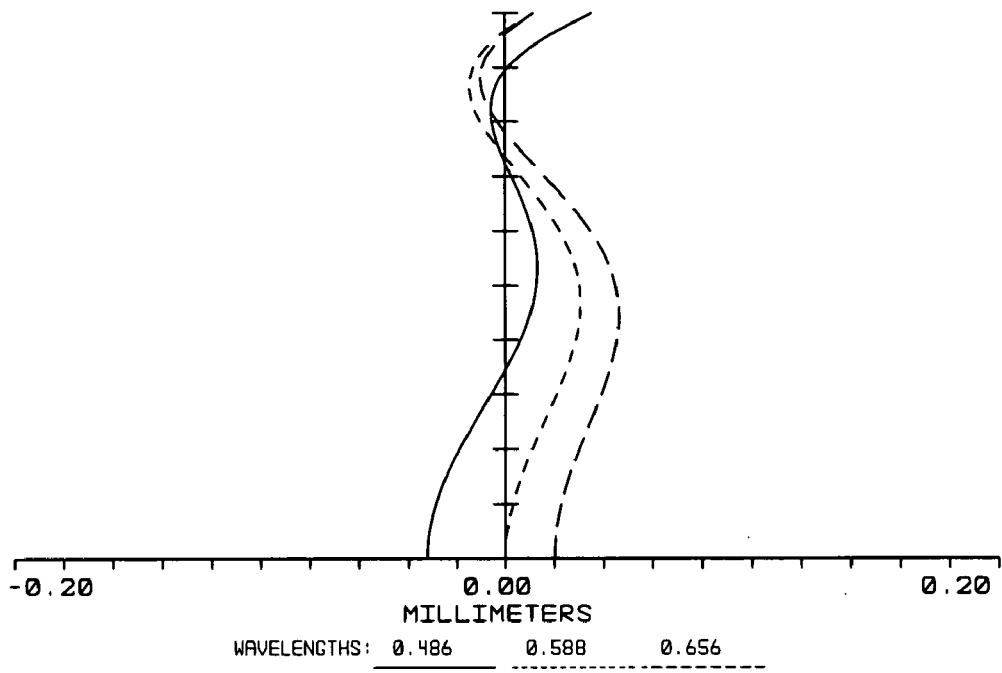
FIGS. 51-53 are graphs respectively showing the longitudinal spherical aberration, and the field curvature and distortion for a zoom lens system in accordance with a sixth embodiment at the middle-focal-length position.
Figure 52:
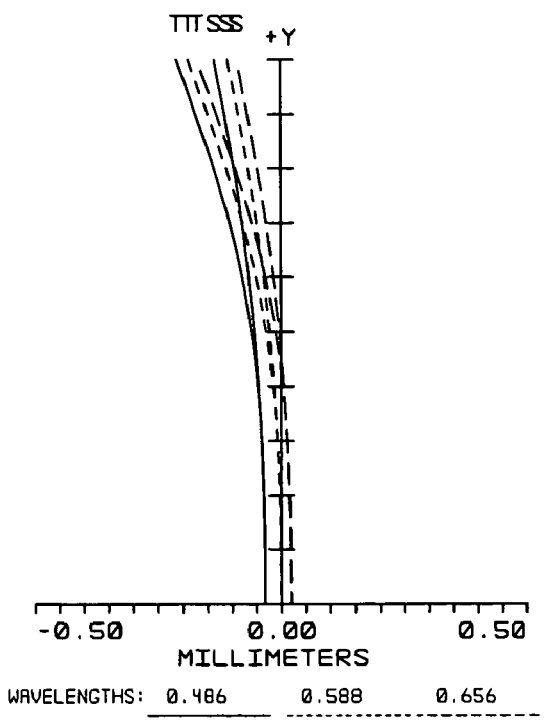
Figure 53:
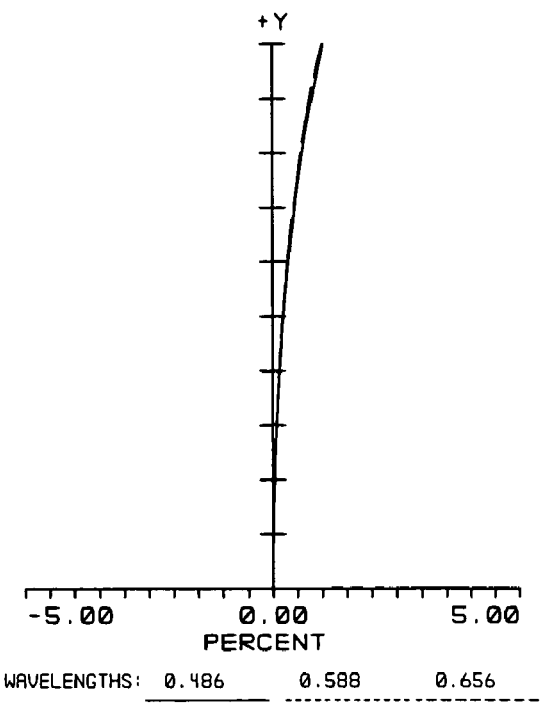

FIGS. 48-50 are graphs respectively showing the longitudinal spherical aberration, and the field curvature and distortion for the zoom lens system of Embodiment 6 at the wide-angle end. FIGS. 51-53 are graphs respectively showing the longitudinal spherical aberration, and the field curvature and distortion for the zoom lens system of Embodiment 6 at the middle-focal-length position. FIGS. 54-56 are graphs respectively Showing the longitudinal spherical aberration, and the field curvature and distortion for the zoom lens system of Embodiment 6 at the telephoto position.

Figure 57:
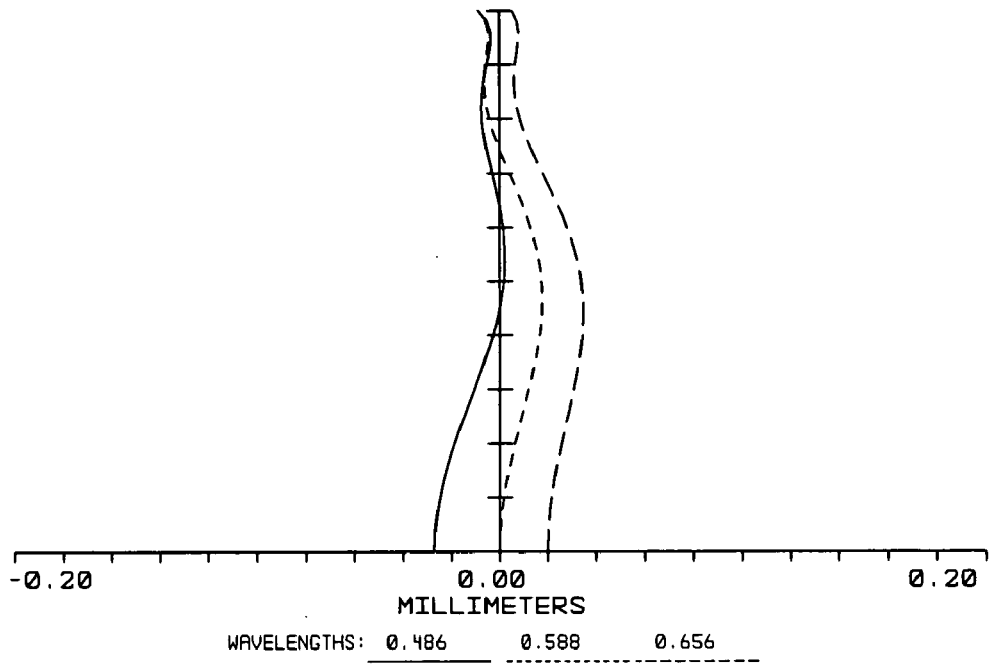
FIGS. 57-59 are graphs respectively showing the longitudinal spherical aberration, and the field curvature and distortion for a zoom lens system in accordance with a seventh embodiment at the wide-angle end.
Figure 58:
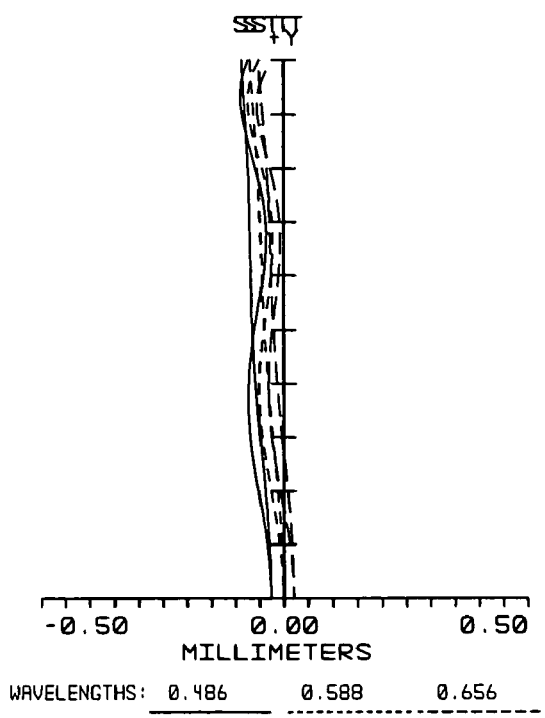
Figure 59:
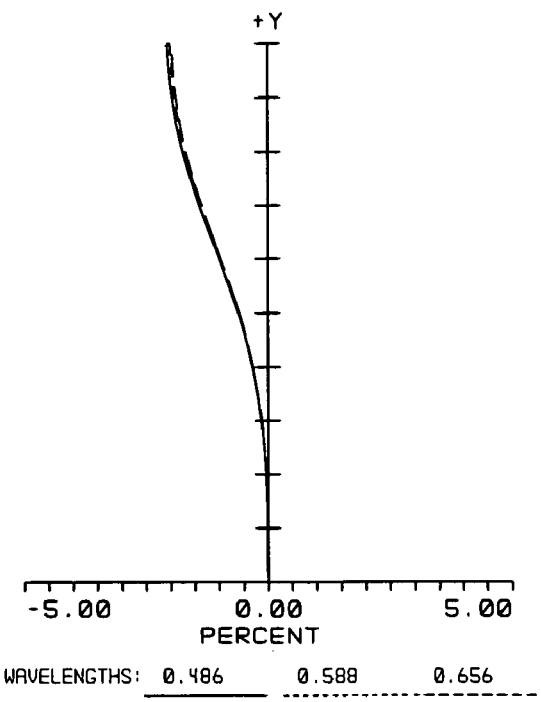
Figure 60:
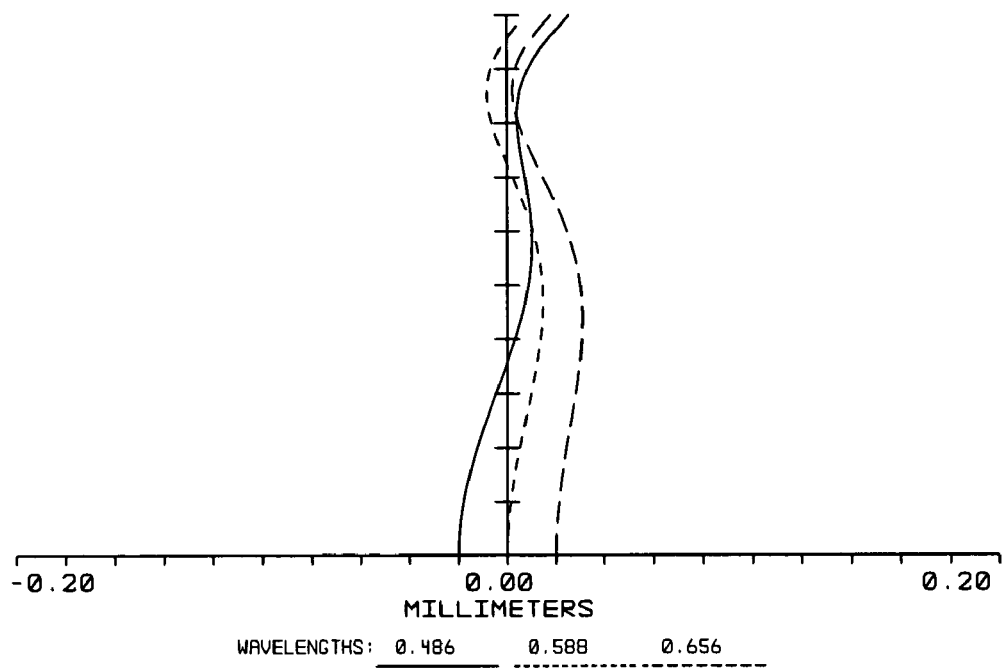
FIGS. 60-62 are graphs respectively showing the longitudinal spherical aberration, and the field curvature and distortion for a zoom lens system in accordance with a seventh embodiment at the middle-focal-length position.
Figure 61:
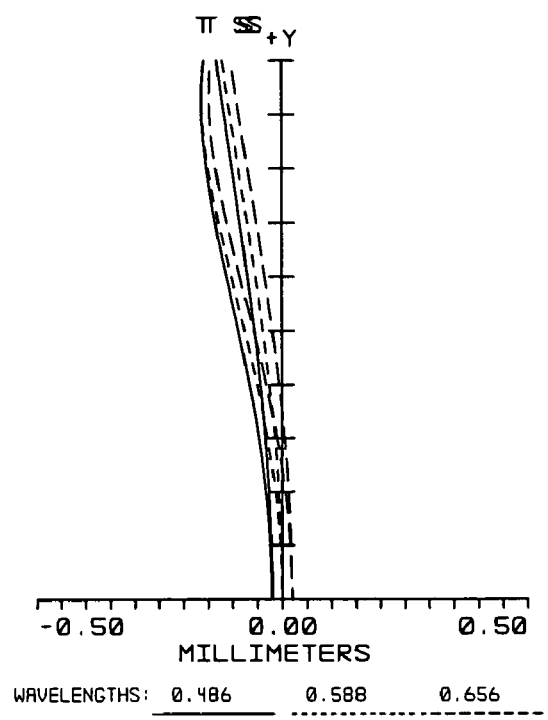
Figure 62:
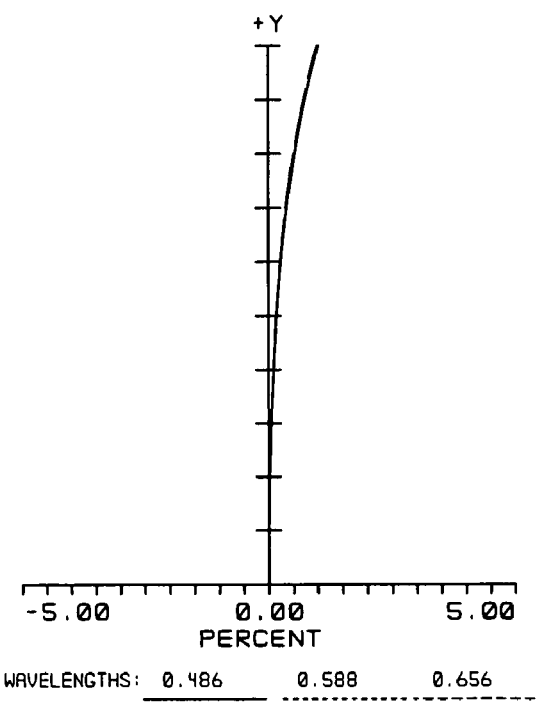
Figure 63:
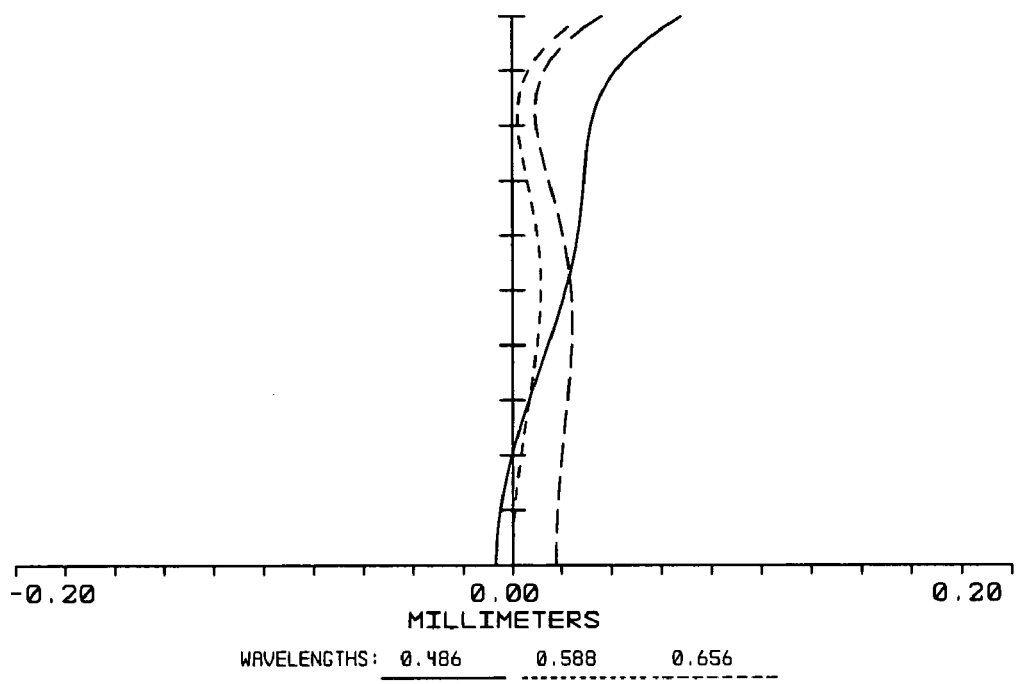
FIGS. 63-65 are graphs respectively showing the longitudinal spherical aberration, and the field curvature and distortion for a zoom lens system in accordance with a seventh embodiment.
Figure 64:
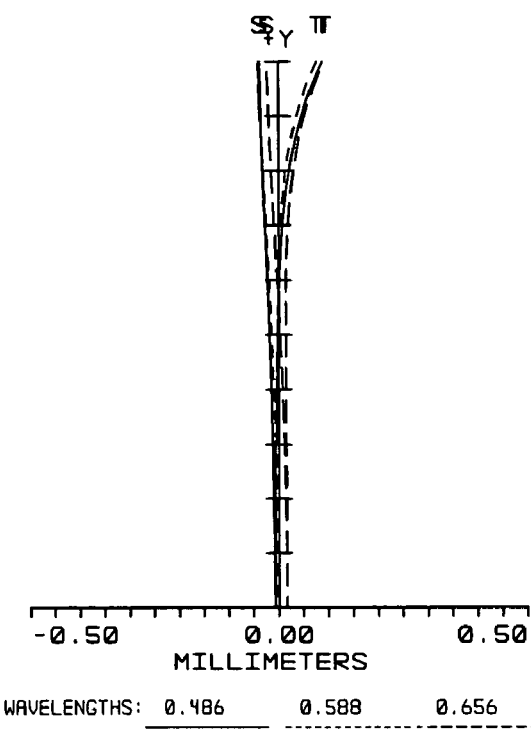
Figure 65:
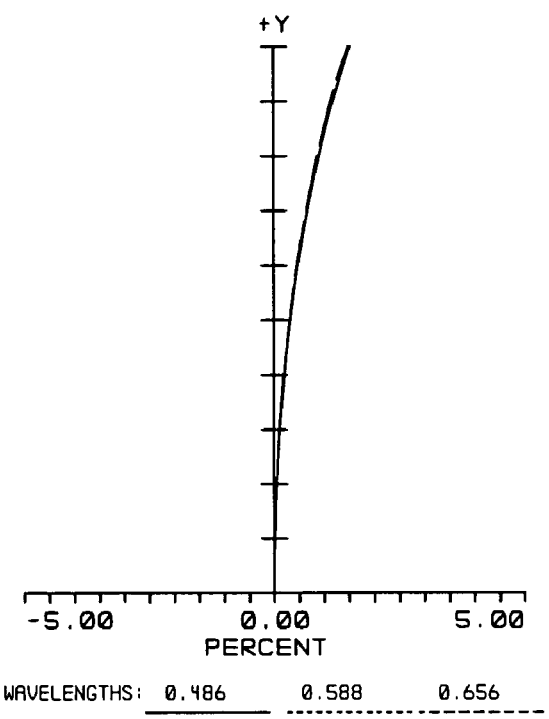

FIGS. 57-59 are graphs respectively showing the longitudinal spherical aberration, and the field curvature and distortion for the zoom lens system of Embodiment 7 at the wide-angle end. FIGS. 60-62 are graphs respectively showing the longitudinal spherical aberration, and the field curvature and distortion for the zoom lens system of Embodiment 7 at the middle-focal-length position. FIGS. 63-65 are graphs respectively showing the longitudinal spherical aberration, and the field curvature and distortion for the zoom lens system of Embodiment 7 at the telephoto position.

EMBODIMENT 7

Tables 20, 21 and 22 show lens data of a zoom lens system of a seventh embodiment.

EMBODIMENT 8

Tables 23, 24 and 25 show lens data of a zoom lens system of a eighth embodiment.

TABLE 20

| Surface No. | r | d | $n_d$ | $v_d$ |
|---|---|---|---|---|
| 1 | −18011.02 | 0.40 | 1.65844 | 50.88 |
| 2 | 3.408 | 1.04 | | |
| 3 | 4.473 | 0.823 | 1.65446 | 33.65 |
| 4 | 8.756 | $d_4$(variable) | | |
| 5 | ∞ | 0.50 | | |
| 6 | 2.329 | 1.38 | 1.60738 | 56.65 |
| 7 | −8.277 | 0.36 | | |
| 8 | −3.342 | 0.65 | 1.80518 | 25.39 |
| 9 | −22.767 | $d_9$(variable) | | |
| 10 | ∞ | 0.4 | 1.52308 | 58.57 |
| 11 | ∞ | 1 | | |

TABLE 23

| Surface No. | r | d | $n_d$ | $v_d$ |
|---|---|---|---|---|
| 1 | −21.628 | 0.40 | 1.65830 | 57.26 |
| 2 | 4.137 | 1.03 | | |
| 3 | 4.686 | 0.49 | 1.80518 | 25.36 |
| 4 | 6.332 | $d_4$(variable) | | |
| 5 | ∞ | 0.40 | | |
| 6 | 2.242 | 1.54 | 1.65113 | 55.89 |
| 7 | −10.049 | 0.24 | | |
| 8 | −3.334 | 0.40 | 1.84666 | 23.62 |
| 9 | −18.833 | $d_9$(variable) | | |
| 10 | ∞ | 0.4 | 1.52308 | 58.57 |
| 11 | ∞ | 1 | | |

TABLE 21

| Surface No. | $A_4$ | $A_6$ | $A_8$ | $A_{10}$ |
|---|---|---|---|---|
| 1 | $4.19933 \times 10^{-3}$ | $-2.49558 \times 10^{-4}$ | $6.71258 \times 10^{-6}$ | $-8.10186 \times 10^{-8}$ |
| 2 | $1.61539 \times 10^{-3}$ | $4.29429 \times 10^{-4}$ | $-4.58978 \times 10^{-5}$ | $4.97554 \times 10^{-7}$ |
| 3 | $-3.53969 \times 10^{-3}$ | $-1.16457 \times 10^{-5}$ | $8.40477 \times 10^{-6}$ | $-7.75956 \times 10^{-6}$ |
| 4 | $-3.06872 \times 10^{-3}$ | $9.66119 \times 10^{-5}$ | $-7.04784 \times 10^{-5}$ | $-2.85672 \times 10^{-8}$ |
| 6 | $-4.24336 \times 10^{-3}$ | $7.89428 \times 10^{-5}$ | $-2.75614 \times 10^{-4}$ | $-3.77070 \times 10^{-5}$ |
| 7 | $-1.74456 \times 10^{-3}$ | $2.61533 \times 10^{-3}$ | $-7.06689 \times 10^{-4}$ | $4.28416 \times 10^{-5}$ |
| 8 | $4.82285 \times 10^{-2}$ | $-5.06084 \times 10^{-3}$ | $4.15620 \times 10^{-4}$ | $-9.34468 \times 10^{-5}$ |
| 9 | $5.70729 \times 10^{-2}$ | $4.22784 \times 10^{-4}$ | $1.35352 \times 10^{-3}$ | $1.28561 \times 10^{-4}$ |

TABLE 24

| Surface No. | $A_4$ | $A_6$ | $A_8$ | $A_{10}$ |
|---|---|---|---|---|
| 1 | $1.15675 \times 10^{-2}$ | $-1.16425 \times 10^{-4}$ | $-3.24721 \times 10^{-5}$ | |
| 2 | $7.47586 \times 10^{-4}$ | $3.00777 \times 10^{-3}$ | $-1.37112 \times 10^{-4}$ | |
| 3 | $-3.50463 \times 10^{-2}$ | $-5.53384 \times 10^{-4}$ | $3.35231 \times 10^{-4}$ | $-1.33377 \times 10^{-5}$ |
| 4 | $-3.23489 \times 10^{-2}$ | $3.34311 \times 10^{-4}$ | $2.88355 \times 10^{-4}$ | $-2.43154 \times 10^{-5}$ |
| 6 | $-2.09496 \times 10^{-3}$ | $8.67809 \times 10^{-4}$ | $-2.62228 \times 10^{-4}$ | |
| 7 | $2.32639 \times 10^{-2}$ | $-3.93391 \times 10^{-3}$ | $-1.51304 \times 10^{-3}$ | |
| 8 | 0.11557 | −0.04823 | 0.01327 | $-3.08836 \times 10^{-3}$ |
| 9 | 0.10723 | −0.02475 | $7.96645 \times 10^{-3}$ | $-9.37044 \times 10^{-4}$ |

TABLE 25

| | W | M | T |
|---|---|---|---|
| f (mm) | 4.5 | 6.75 | 9 |
| Fno. | 3.2 | 4.1 | 5 |
| ω (°) | 32 | 22.5 | 17.5 |
| $d_4$ | 4.76 | 2.05 | 0.70 |
| $d_9$ | 4.84 | 6.37 | 7.90 |

Figure 66:
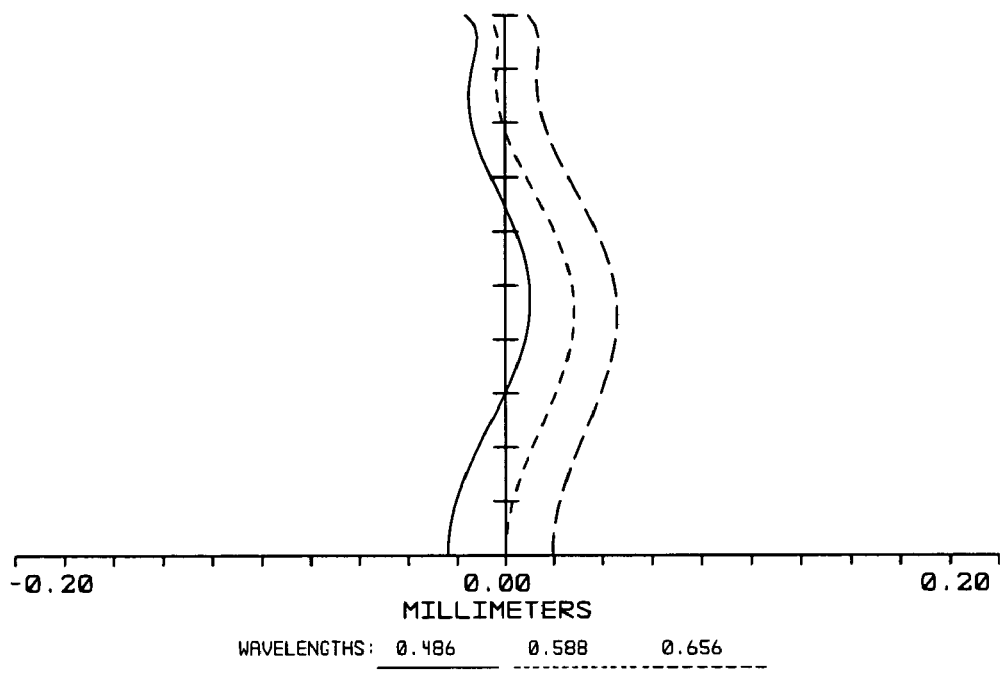
FIGS. 66-68 are graphs respectively showing the longitudinal spherical aberration, and the field curvature and distortion for a zoom lens system in accordance with a eighth embodiment at the wide-angle end.
Figure 67:
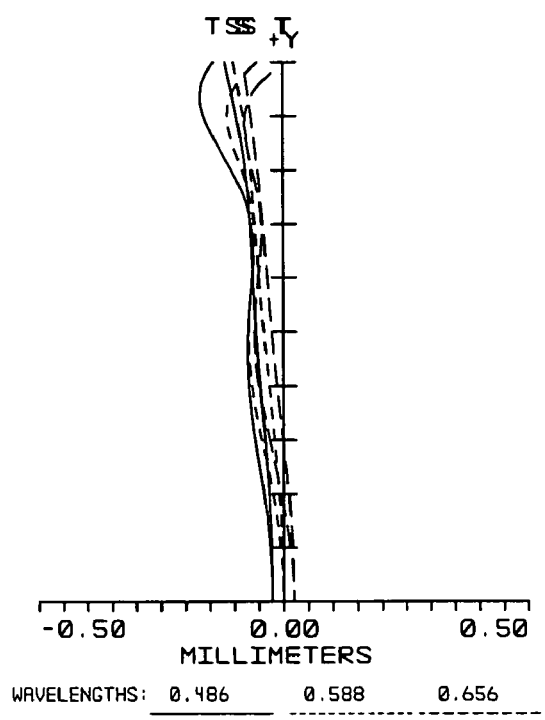
Figure 68:
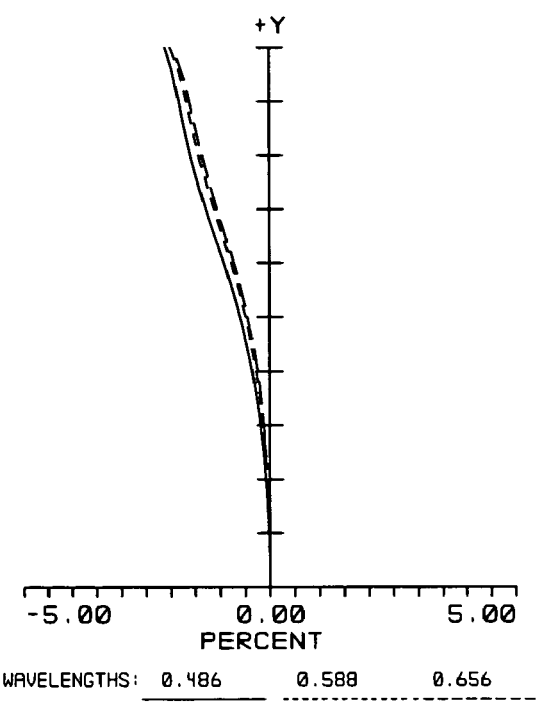
Figure 69:
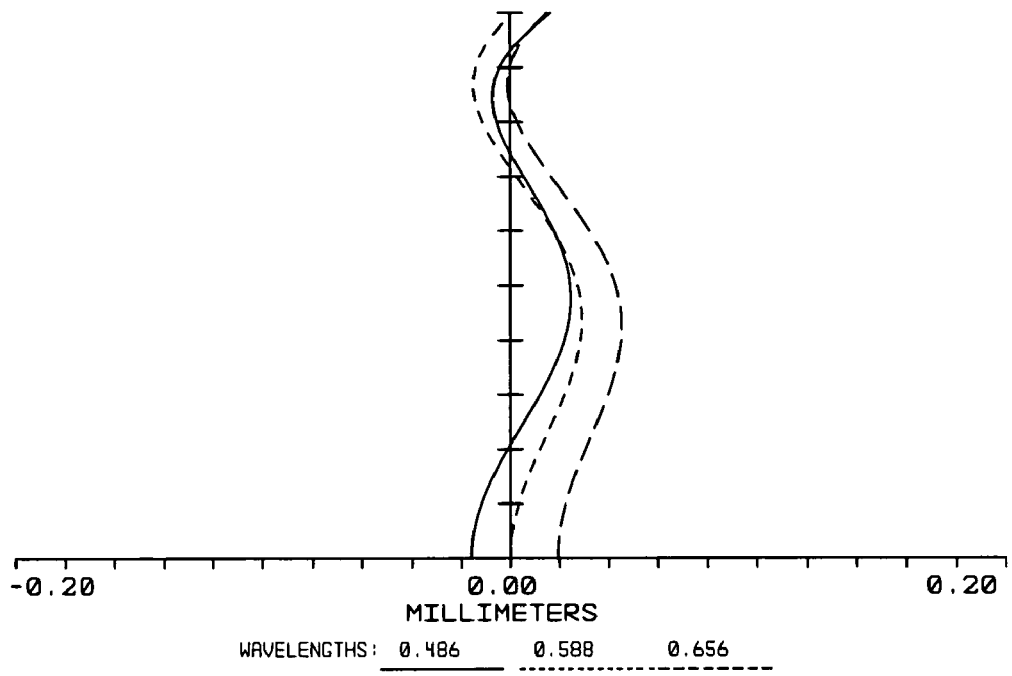
FIGS. 69-71 are graphs respectively showing the longitudinal spherical aberration, and the field curvature and distortion for a zoom lens system in accordance with a eighth embodiment at the telephoto end.
Figures 70, 71:
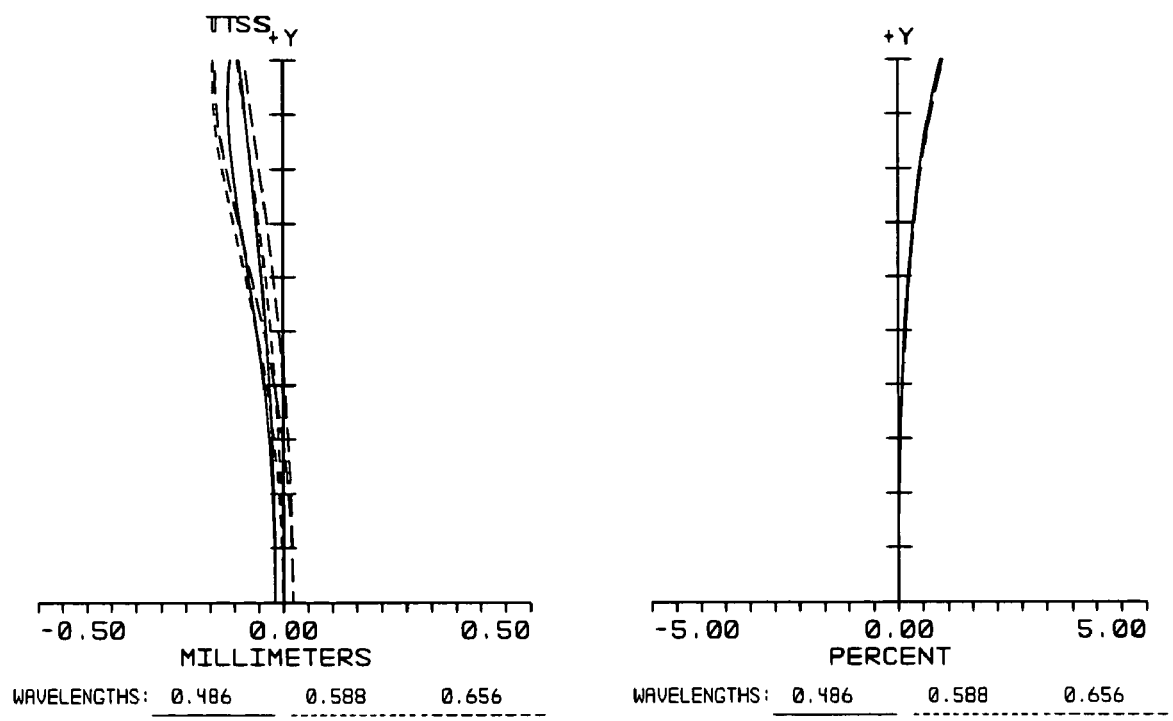
Figure 72:
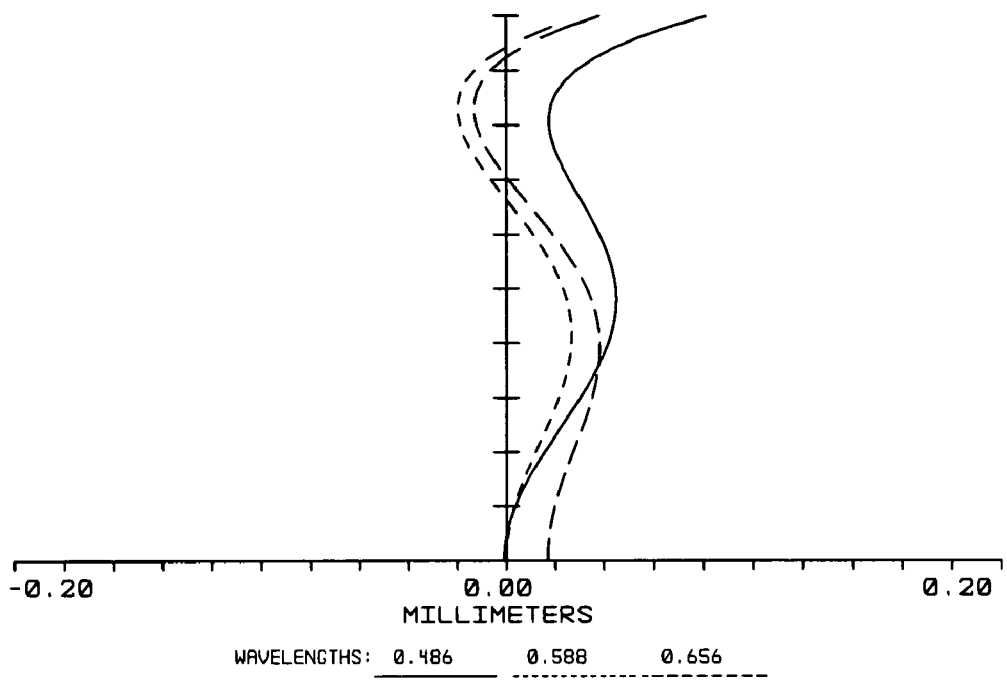
FIGS. 72-74 are graphs respectively showing the longitudinal spherical aberration, and the field curvature and distortion for a zoom lens system in accordance with a eighth embodiment at the wide-angle end.
Figure 73:
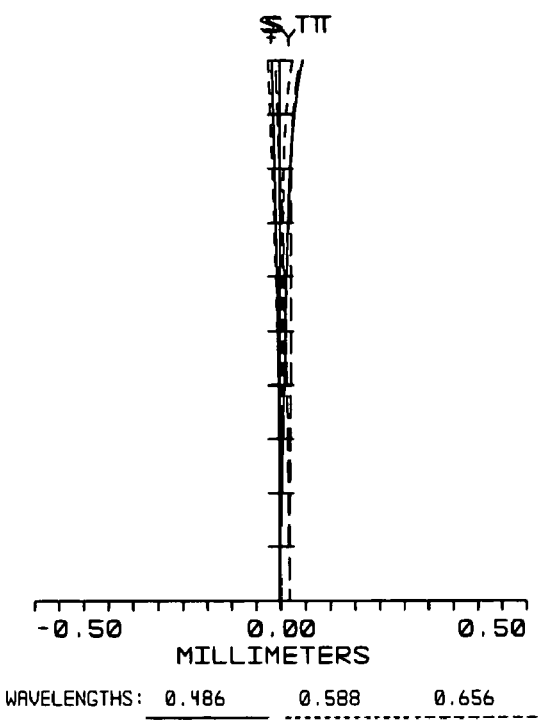
Figure 74:
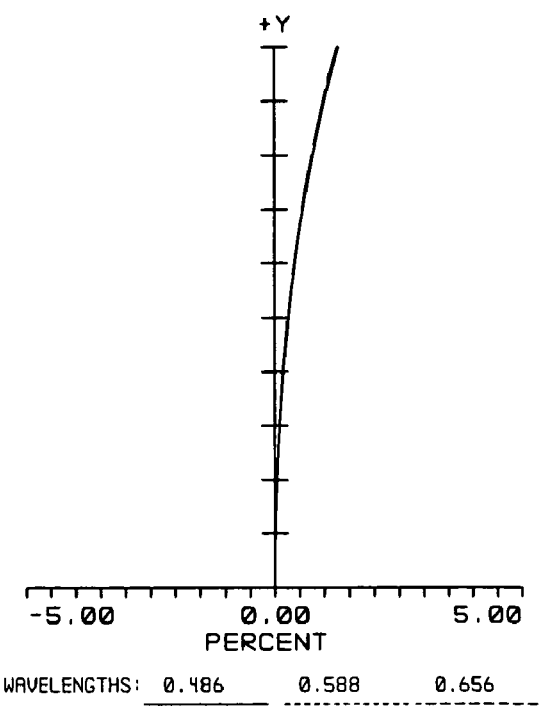

FIGS. 66-68 are graphs respectively showing the longitudinal spherical aberration, and the field curvature and distortion for the zoom lens system of Embodiment 8 wide-angle end. FIGS. 69-71 are graphs respectively showing the longitudinal spherical aberration, and the field curvature and distortion for the zoom lens system of Embodiment 8 at the middle-focal-length position. FIGS. 72-74 are graphs respectively showing the longitudinal spherical aberration, and the field curvature and distortion for the zoom lens system of Embodiment 8 at the telephoto position.

EMBODIMENT 9

Tables 26, 27 and 28 show lens data of a zoom lens system of a ninth embodiment.

TABLE 26

| Surface No. | r | d | $n_d$ | $v_d$ |
|---|---|---|---|---|
| 1 | 8.262 | 0.40 | 1.75397 | 52.43 |
| 2 | 2.852 | 0.96 | | |
| 3 | 4.796 | 0.78 | 1.58547 | 29.91 |
| 4 | 7.754 | $d_4$(variable) | | |
| 5 | ∞ | 0.40 | | |
| 6 | 2.378 | 1.49 | 1.64049 | 60.10 |
| 7 | −6.079 | 0.17 | | |
| 8 | −2.242 | 0.60 | 1.58547 | 29.91 |
| 9 | −14.286 | $d_9$(variable) | | |
| 10 | ∞ | 0.4 | 1.52308 | 58.57 |
| 11 | ∞ | 1 | | |

TABLE 27

| Surface No. | $A_4$ | $A_6$ | $A_8$ | $A_{10}$ |
|---|---|---|---|---|
| 1 | $8.15509 \times 10^{-4}$ | $-5.85306 \times 10^{-5}$ | $-3.84747 \times 10^{-6}$ | $3.768940 \times 10^{-7}$ |
| 2 | $-6.72645 \times 10^{-4}$ | $2.39301 \times 10^{-4}$ | $-5.40018 \times 10^{-5}$ | $2.54959 \times 10^{-6}$ |
| 3 | $-5.33959 \times 10^{-3}$ | $-8.49194 \times 10^{-4}$ | $2.956397 \times 10^{-4}$ | $-4.52691 \times 10^{-5}$ |
| 4 | $-9.03369 \times 10^{-3}$ | $3.47341 \times 10^{-4}$ | $-9.08912 \times 10^{-5}$ | $-8.66980 \times 10^{-6}$ |
| 6 | $-2.72684 \times 10^{-3}$ | $1.34701 \times 10^{-3}$ | $-7.22203 \times 10^{-4}$ | $1.45704 \times 10^{-4}$ |
| 7 | $1.87020 \times 10^{-3}$ | $7.75791 \times 10^{-3}$ | $-3.17591 \times 10^{-3}$ | $3.39316 \times 10^{-5}$ |
| 8 | $9.20738 \times 10^{-2}$ | $-1.78235 \times 10^{-2}$ | $2.09071 \times 10^{-3}$ | $-6.75376 \times 10^{-4}$ |
| 9 | $9.40175 \times 10^{-2}$ | $-1.38981 \times 10^{-2}$ | $4.30161 \times 10^{-3}$ | $-1.43722 \times 10^{-4}$ |

TABLE 28

| | W | M | T |
|---|---|---|---|
| f (mm) | 4.5 | 6.75 | 9 |
| Fno. | 3.1 | 3.8 | 4.6 |
| ω (°) | 32 | 22.5 | 17.5 |
| $d_4$ | 5.38 | 2.06 | 0.40 |
| $d_9$ | 4.72 | 6.06 | 7.41 |

Figure 78:
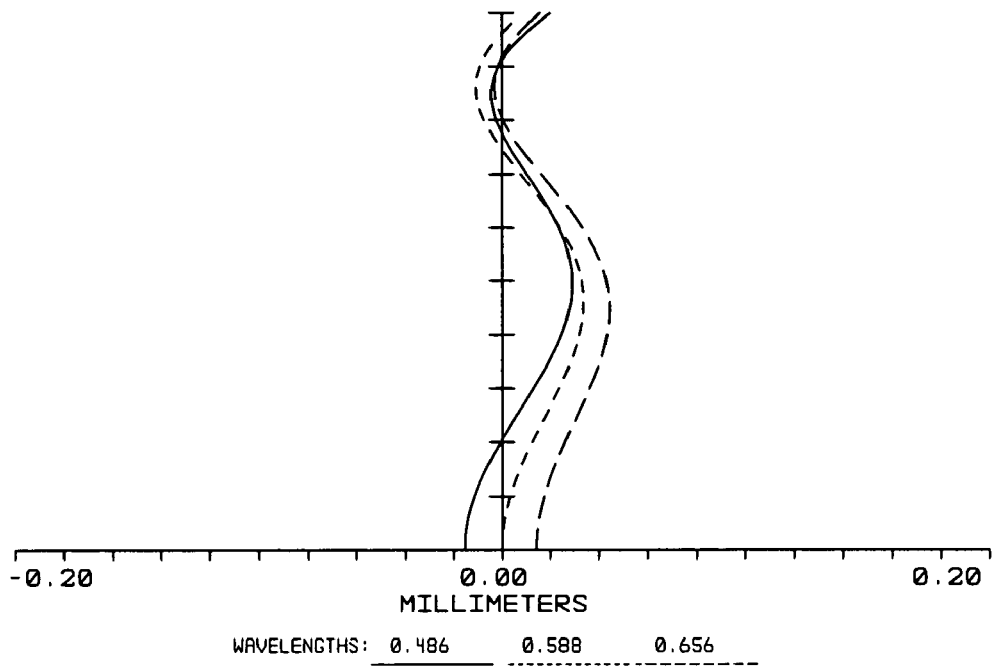
FIGS. 78-80 are graphs respectively showing the longitudinal spherical aberration, and the field curvature and distortion for a zoom lens system in accordance with a ninth embodiment.
Figure 79:
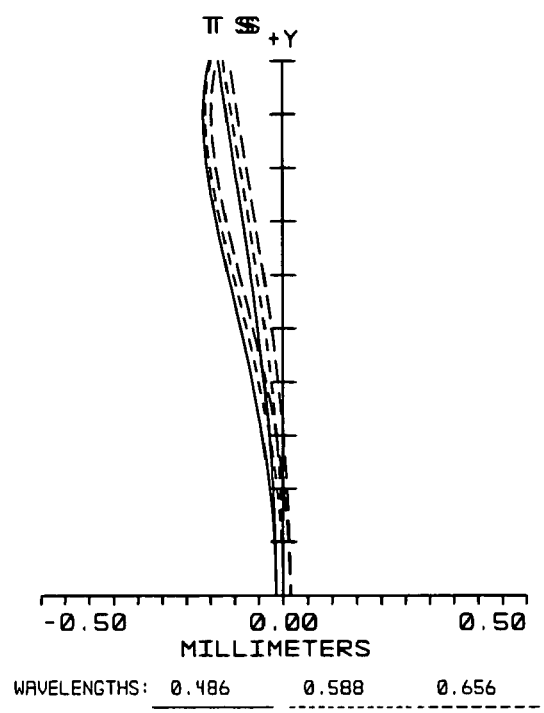
Figure 80:
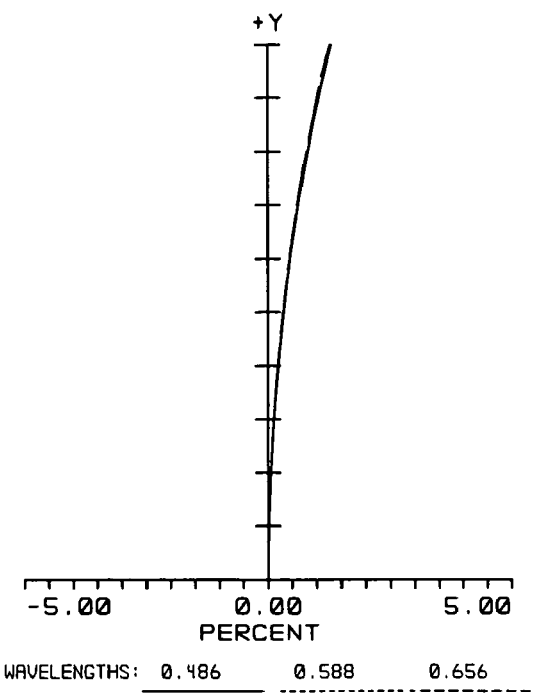
Figure 81:
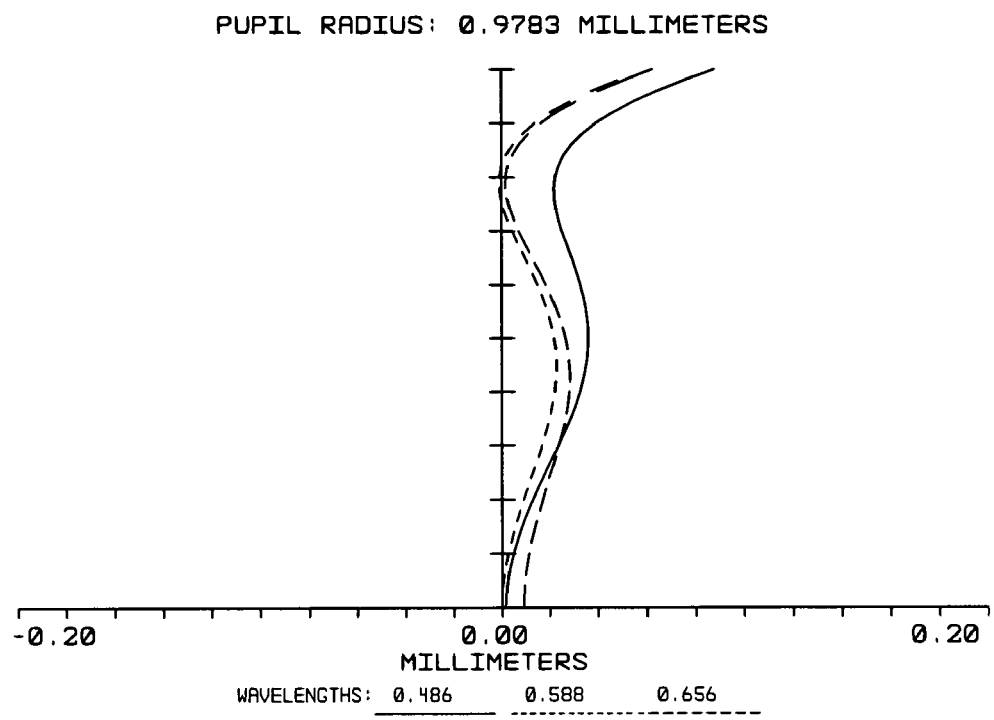
FIGS. 81-83 are graphs respectively showing the longitudinal spherical aberration, and the field curvature and distortion for a zoom lens system in accordance with a ninth embodiment at the telephoto end.
Figure 82:
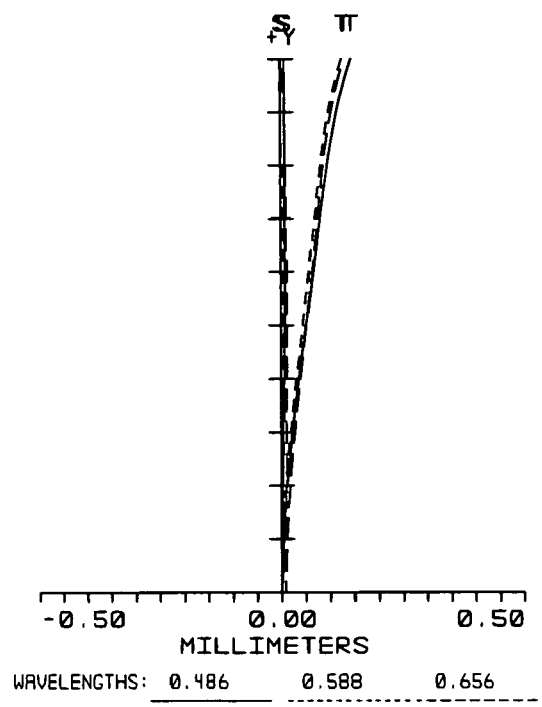
Figure 83:
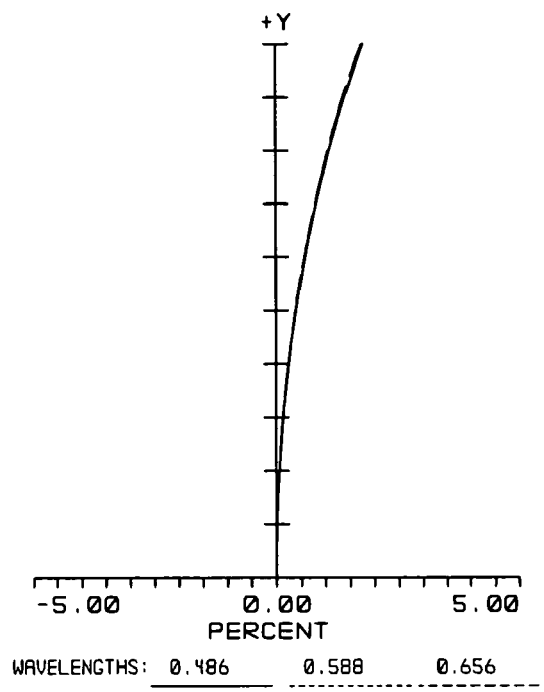

FIGS. 75-77 are graphs respectively showing the longitudinal spherical aberration and the field curvature and distortion for the zoom lens system of Embodiment 9 at the wide-angle end. FIGS. 78-80 are graphs respectively showing the longitudinal spherical aberration, and the field curvature and distortion for the zoom lens system of Embodiment 9 at the middle-focal-length position. FIGS. 81-83 are graphs respectively showing the longitudinal spherical aberration, and the field curvature and distortion for the zoom lens system of Embodiment 9 at the telephoto position.

Table 29 shows lens datum across Embodiments 1 through 9 relate to the foresaid conditions.

TABLE 29

| | Condition | | | | | | |
|---|---|---|---|---|---|---|---|
| Embodiment | 1<br>$T_W/(f_W \cdot \tan\omega_w)$ | 2<br>$d_{G1}/f_W$ | 3<br>$\phi_1/\phi_W$ | 4<br>$\phi_2/\phi_W$ | 5<br>$V_1 - V_2$ | 6<br>$V_3 - V_4$ | 7<br>$|(C_8 - C_9)/(C_8 + C_9)|$ |
| 1 | 5.405 | 0.487 | −0.510 | 0.897 | 22.7 | 30.34 | 0.383 |
| 2 | 5.319 | 0.478 | −0.515 | 0.910 | 26.51 | 30.19 | 0.443 |
| 3 | 5.319 | 0.476 | −0.523 | 0.900 | 27.98 | 28.47 | 0.437 |
| 4 | 5.319 | 0.498 | −0.523 | 0.906 | 24.85 | 31.06 | 0.662 |
| 5 | 5.319 | 0.473 | −0.515 | 0.910 | 25.50 | 30.19 | 0.447 |
| 6 | 5.319 | 0.476 | −0.517 | 0.910 | 25.50 | 30.19 | 0.466 |
| 7 | 6.29 | 0.509 | −0.486 | 0.810 | 17.23 | 31.26 | 0.744 |
| 8 | 5.495 | 0.427 | −0.615 | 0.900 | 31.90 | 32.27 | 0.699 |
| 9 | 5.780 | 0.476 | −0.520 | 0.869 | 22.52 | 30.19 | 0.729 |

As shown in the above-described Embodiments 1-9, the zoom lens system employs a negative group at the object side and a positive group at the image side. The total length of the zoom lens system is relatively small. The zoom lens system can appropriately correct fundamental aberrations. Furthermore, the second lens 120 and the fourth lens 230 can be made from a same optical plastic. Therefore, cost of the zoom lens system can be reduced. In addition, though focus shift due to temperature is commonly found when using plastic lenses, the focus shifts of the second lens 120 and the fourth lens 230 are opposite. The focus shift of the zoom lens system thereby can be reduced, and the reduction of optical performance of the zoom lens can be avoid.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A zoom lens system having an object side and an image side, comprising:
   a negative first lens group, the first lens group comprising:
      a meniscus-shaped first lens with negative refracting power, the first lens having a concave surface facing the image side, and
      a second lens with positive refracting power; and
   a positive second lens group, the second lens group comprising:
      an aperture stop,
      a biconvex third lens with positive refracting power, and
      a meniscus-shaped fourth lens with negative refracting power, the fourth lens having a concave surface facing the object side;
   wherein, the first lens, the second lens, the aperture stop, the third lens and the fourth lens are coaxially disposed in that order from the object side to the image side, and the following condition is satisfied:

$$3.5 < T_w/(f_w \cdot \tan\omega_w) < 7.5, \quad (1)$$

wherein, $T_w$ is a total length of the zoom lens system at a wide-angle end, $f_w$ is a focal length of the zoom lens system at the wide-angle end, and $\omega_w$ is a half angle of field of view of the zoom lens system at the wide-angle end.

2. The zoom lens system in accordance with claim 1, wherein the following condition is satisfied:

$$0.3 < d_{G1}/f_w < 0.7, \quad (2)$$

wherein, $d_{G1}$ is a thickness of the first lens group, and $f_w$ is a focal length of the zoom lens system at the wide-angle end.

3. The zoom lens system in accordance with claim 1, wherein the following condition is satisfied:

$$-0.7 < \phi_1/\phi_w < -0.3, \quad (3)$$

wherein, $\phi_1$ is a refracting power of the first lens group, $\phi_w$ is a refracting power of the zoom lens system at the wide-angle end.

4. The zoom lens system in accordance with claim 1, wherein the following condition is satisfied:

$$0.5 < \phi_2/\phi_w < 0.95, \quad (4)$$

wherein, $\phi_2$ is a refracting power of the second lens group, and $\omega_w$ is a refracting power of the zoom lens system at the wide-angle end.

5. The zoom lens system in accordance with claim 1, wherein the following conditions are satisfied:

$$15 < v_1 - v_2 < 40, \text{ and} \quad (5)$$

$$20 < v_3 - v_4 < 40, \quad (6)$$

wherein, $v_1$, $v_2$, $v_3$, and $v_4$ are Abbe constants of the first to fourth lenses respectively.

6. The zoom lens system in accordance with claim 1, wherein the following condition is satisfied:

$$0.3 < |(C_8 - C_9)/(C_8 + C_9)| < 0.8, \quad (7)$$

wherein, $C_8$ and $C_9$ are vertex curvatures of the two surfaces of the fourth lens on the object and image sides respectively.

7. The zoom lens system in accordance with claim 1, wherein the second lens and the fourth lens are both aspheric lenses.

8. The zoom lens system in accordance with claim 1, wherein the first lens and the third lens are both spheric lenses.

9. The zoom lens system in accordance with claim 1, wherein one of the first lens and the third lens is an aspheric lens.

10. The zoom lens system in accordance with claim 1, wherein the first lens and the third lens are both aspheric lenses.

11. The zoom lens system in accordance with claim 1, wherein the zoom lens system further comprises a filter provided between the fourth lens and the image side.

12. The zoom lens system in accordance with claim 11, wherein the filter is selected from the group comprising an infrared cut absorption filter, a low-pass filter.

13. The zoom lens system in accordance with claim 1, wherein the second lens and the fourth lens are made from a same optical plastic.

14. The zoom lens system in accordance with claim 13, wherein the optical plastic is polycarbonate.

15. A zoom lens system defining an object side and an image side and consisting of only four lenses, the four lenses comprising:
- a first lens with negative refracting power;
- a second lens with positive refracting power;
- a third lens with negative refracting power; and
- a fourth lens with positive refracting power, the fourth lens having meniscus shape with a concave surface facing the object side, wherein
  the first lens, the second lens, the third lens and the fourth lens are disposed in that order from the object side to the image side, the first lens and the second lens cooperatively constitute a negative lens group, the third lens and the fourth lens cooperatively constitute a positive lens group, and the following condition is satisfied:

$$3.5 < T_w/(f_w \cdot \tan \omega_w) < 7.5,$$

wherein, $T_w$ is a total length of the zoom lens system at a wide-angle end, $f_w$ is a focal length of the zoom lens system at the wide-angle end, and cow is a half angle of field of view of the zoom lens system at the wide-angle end;

wherein the second lens and the fourth lens both are aspheric lenses.

16. The zoom lens system in accordance with claim 15, wherein the first lens has meniscus shape with a concave surface facing the image side.

* * * * *